US012059689B2

(12) United States Patent
Ryu et al.

(10) Patent No.: US 12,059,689 B2
(45) Date of Patent: Aug. 13, 2024

(54) FILTER FOR TRAPPING PARTICULATE MATTER INCLUDING VERTICAL NANO-GAP ELECTRODE WITH PLURALITY OF HOLES AND AIR CONDITIONING APPARATUS HAVING THE SAME

(71) Applicant: KOREA INSTITUTE OF SCIENCE AND TECHNOLOGY, Seoul (KR)

(72) Inventors: Yong-Sang Ryu, Seoul (KR); Eui-Sang Yu, Seoul (KR); Taehyun Kim, Seoul (KR); Sang Moon Kim, Gyeonggi-do (KR); Jongsu Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 393 days.

(21) Appl. No.: 17/023,685

(22) Filed: Sep. 17, 2020

(65) Prior Publication Data

US 2021/0086194 A1 Mar. 25, 2021

(30) Foreign Application Priority Data

Sep. 23, 2019 (KR) ........................ 10-2019-0117022
Aug. 3, 2020 (KR) ........................ 10-2020-0096663

(51) Int. Cl.
*B03C 3/09* (2006.01)
*B03C 3/47* (2006.01)
(Continued)

(52) U.S. Cl.
CPC .................. *B03C 3/09* (2013.01); *B03C 3/47* (2013.01); *B03C 3/68* (2013.01); *B03C 3/70* (2013.01);
(Continued)

(58) Field of Classification Search
CPC .... B03C 3/09; B03C 3/47; B03C 3/68; B03C 3/70; B03C 3/78; B03C 2201/28;
(Continued)

(56) References Cited

U.S. PATENT DOCUMENTS 5,403,383 A * 4/1995 Jaisinghani ............. B03C 3/155 95/79
6,245,132 B1 * 6/2001 Feldman ................... A61L 2/03 96/28
(Continued)

FOREIGN PATENT DOCUMENTS

CN 103623669 3/2014
JP H0921778 1/1997
(Continued)

OTHER PUBLICATIONS

J.D. Duff, University of Louisville, Master's thesis, 2013, 99 pages.

*Primary Examiner* — Christopher P Jones
*Assistant Examiner* — Sonji Turner
(74) *Attorney, Agent, or Firm* — Ohlandt, Greeley and Perle, LLP

(57) ABSTRACT

An air conditioning apparatus is provided. The air conditioning apparatus includes: a filter configured to have a first conductor layer, an insulating layer having a thickness in the range of 5 nm to 1000 nm, and a second conductor layer which are sequentially stacked, and include a plurality of holes penetrating through the first conductor layer, the insulating layer, and the second conductor layer; a fan assembly configured to suck air from the outside and provide the sucked air to the filter; a power supply device configured to provide alternating current power between the first conductor layer and the second conductor layer; and a processor configured to control the power supply device to
(Continued)

selectively vary a frequency or a voltage magnitude of the alternating current power provided to the filter.

13 Claims, 18 Drawing Sheets

(51) Int. Cl.
*B03C 3/68* (2006.01)
*B03C 3/70* (2006.01)
*B03C 3/78* (2006.01)
*F24F 8/192* (2021.01)

(52) U.S. Cl.
CPC ................ *F24F 8/192* (2021.01); *B03C 3/78* (2013.01); *B03C 2201/28* (2013.01)

(58) Field of Classification Search
CPC ... B03C 3/60; F24F 8/192; F24F 1/035; F24F 1/0353; F24F 11/63; F24F 11/88; F24F 8/10; F24F 8/108; B01D 57/02; B01D 39/16; B01D 39/2027; B01D 2239/1241
See application file for complete search history.

(56) References Cited

U.S. PATENT DOCUMENTS

| | | | | |
|---|---|---|---|---|
| 6,811,663 | B1 | 11/2004 | Freeman | |
| 7,169,282 | B2 | 1/2007 | Talary | |
| 8,003,058 | B2 * | 8/2011 | Bergeron | A61L 9/22<br>422/186.04 |
| 8,864,973 | B2 | 10/2014 | Hughes | |
| 9,452,236 | B2 * | 9/2016 | Miyamoto | H05H 1/2406 |

FOREIGN PATENT DOCUMENTS

| | | | | |
|---|---|---|---|---|
| JP | 2002515603 | | | 5/2002 |
| JP | 2009095768 | | | 5/2009 |
| JP | 2012510051 | A | * | 4/2012 |
| JP | 2015016431 | A | * | 1/2015 |
| KR | 20050051119 | A | * | 6/2005 |
| KR | 20150112886 | | | 10/2015 |
| KR | 101899013 | | | 9/2018 |
| KR | 20190103537 | | | 9/2019 |
| KR | 20190111462 | | | 10/2019 |
| KR | 20200074785 | | | 6/2020 |

* cited by examiner

FILTER FOR TRAPPING PARTICULATE MATTER INCLUDING VERTICAL NANO-GAP ELECTRODE WITH PLURALITY OF HOLES AND AIR CONDITIONING APPARATUS HAVING THE SAME

CROSS-REFERENCE TO RELATED APPLICATION(S)

This application is based on and claims priority under 35 U.S.C. § 119 to Korean Patent Application No. 10-2019-0117022, filed on Sep. 23, 2019 and Korean Patent Application No. 10-2020-0096663, filed on Aug. 3, 2020, in the Korean Intellectual Property Office, the disclosures of which are herein incorporated by reference in their entireties.

BACKGROUND

Field

Apparatuses consistent with the disclosure relate to a filter for trapping particulate matter including a vertical nano-gap electrode with a plurality of holes and an air conditioning apparatus having the same, and more particularly, to a filter for trapping particulate matter that may trap the particulate matter, viruses, bacteria, and the like using a filter having a nano-gap and an air conditioning apparatus having the same.

Description of the Related Art

The most notable issue in Korea recently is air pollution caused by "particulate matter (PM)". As the industrial development took place, a concentration of particulate matter in the atmosphere increased rapidly, and in recent years, contamination by fine particulate matter (PM2.5) with a diameter of 2.5 μm or less is particularly emerging as a social issue.

Furthermore, it has been found that the particulate matter weakens lung function and causes bronchial disease, and is closely related to various diseases such as skin disease, cardiovascular disease through capillaries, eye disease, and brain disease, and such pollution is not limited to only the outdoor, but as the effects of viruses and bacteria existing in the indoor air and environmentally harmful PM generated in connection therewith are known, it is important to secure source technologies related to the improvement and/or purification of indoor and outdoor air.

On the other hand, before air quality problems emerged, it was possible to improve the indoor air by simply ventilating through a window opening. However, nowadays, because the outdoor air may cause more damage to a human body, it is urgent to prepare measures to supply good quality air indoors and outdoors.

As part of these efforts, power generation facilities and automobile industries are attempting to prevent air pollution by reducing the generation of pollutants through green energy conversion, but in situations where the demand for power and/or transportation does not decrease, the expected effect of these preventive efforts is negligible, and thus efforts to effectively solve the generated air pollution may be more effective in improving air quality.

Research to improve the air quality is conducted in two main directions that are basically divided into i) research on pollutant generation sources and ii) research on methods of detecting and/or reducing the generated pollutants. Among them, the research to fundamentally reduce the generation of pollution has limitations due to the problem of high investment cost, demand for industrial development, and still high demand for energy.

As a result, much effort has been focused on developing treatment methods and/or apparatuses for detecting and removing or reducing the generated pollutants. In order to detect and/or reduce the pollutants as described above, an ultimate goal is to implement a platform that may detect, filter and/or collect and remove particles of very small sizes, such as 10 μm or less, further 2.5 μm or less, or 1 μm or less, present in trace amounts in the air in real time, and that may be reused or used semi-permanently through cleaning.

For example, a purification system of an air purifier currently being attempted to improve the air quality is largely classified into a filter type and an electrostatic type.

First, a filter type purification apparatus is an apparatus that operates by a strainer method that physically filters pollutants through a mechanical structure, and due to such characteristics, a large pressure drop ($\Delta P$) is inevitable before and after the filter for efficient air quality improvement, and there is a disadvantage that the function is deteriorated accordingly. In addition, there is a disadvantage in that it is impossible to periodically replace the filter and selectively trap the PM of a specific target size.

In this regard, there are reports that the pressure drop accounts for 70% or more of the performance of the air purification apparatus, and thus it is difficult to achieve the air quality improvement in a filter type purification apparatus.

Therefore, such a method, which is represented by a HEPA (high efficiency particulate air or high efficiency particulate absorber) filter, has disadvantages that the smaller the size of the purifiable particles, i.e., the particulate matter, the higher the price, and an air purification capacity per hour is inversely proportional to a dust collection efficiency.

To overcome such disadvantages, there is an effort to manufacture and/or commercialize a filter that reduces the particulate matter by a method of attaching particles to a charged strainer through electrical adsorption using an electrostatic force.

Such an electric precipitation type/ionic (or electrostatic) purification apparatus is based on an improvement in dust collection efficiency ($\Delta E$) expected from the fact that most of the dust and/or bacterial particles to be filtered are charged with negative charges.

Specifically, a process of charging the particles to be trapped by applying static electricity to the filter according to the above-described principle should be accompanied, and there is a fatal disadvantage in that ozone, which is harmful to the human body, is generated from a temporary overcurrent release and/or discharge process in the air through charging. In addition, because the above-described filter is vulnerable to moisture, the performance thereof may be influenced by humidity or rapidly deteriorated.

In addition, in both of the above-described methods, it is impossible to distinguish the type and/or size of the particles to be trapped and cleaning is impossible. As a result, because the filter may not be reused, the filter needs to be periodically replaced.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a filter for trapping particulate matter that may trap the particulate matter, viruses, and bacteria using the filter having a nano-gap and an air conditioning apparatus having the same.

As an aspect, the disclosure provides a filter for trapping particulate matter including a vertical nano-gap electrode having a plurality of holes and driven by a dielectrophoresis method, wherein the vertical nano-gap electrode includes a first conductor electrode, an insulator layer having a constant thickness selected in the range of 5 nm to 1000 nm, and a second conductor electrode which are sequentially stacked, and the both electrodes and the insulator layer include one or more holes spaced apart from each other in the same size and shape.

As another aspect, the disclosure provides an apparatus for reducing particulate matter, including one or more filters including a first conductor electrode, an insulator layer, and a second conductor electrode sequentially stacked, wherein the both electrodes and the insulator layer include one or more holes spaced apart from each other in the same size and shape, and the apparatus includes a suction portion that sucks unfiltered air and a discharge portion that discharges air with reduced particulate matter by the filter, the suction portion and the discharge portion being separated by the filter(s).

As still another aspect, the disclosure provides an air conditioning apparatus including one or more filters for trapping particulate matter that include a vertical nano-gap electrode having a plurality of holes and are driven by a dielectrophoresis method, as functional filters, wherein the vertical nano-gap electrode includes a first conductor electrode, an insulator layer having a constant thickness selected in the range of 5 nm to 1000 nm, and a second conductor electrode that are sequentially stacked, the both electrodes and the insulator layer include one or more holes spaced apart from each other in the same size and shape, and the air conditioning apparatus includes a suction portion that sucks unfiltered air and a discharge portion that discharges air with reduced particulate matter by the filter, the suction portion and the discharge portion being separated by the filter(s).

As still another aspect, the disclosure provides a method for reducing particulate matter using the apparatus for reducing the particulate matter, the method including sucking air containing particulate matter through a suction portion and bringing the sucked air into contact with a filter to which an alternating current of a predetermined frequency is applied, and discharging air with reduced particulate matter transmitted through the filter to the outside through a discharge portion.

According to an embodiment of the disclosure, an air conditioning apparatus includes: a filter configured to have a first conductor layer, an insulating layer having a thickness in the range of 5 nm to 1000 nm, and a second conductor layer which are sequentially stacked, and include a plurality of holes penetrating through the first conductor layer, the insulating layer, and the second conductor layer; a fan assembly configured to suck air from the outside and provide the sucked air to the filter; a power supply device configured to provide alternating current power between the first conductor layer and the second conductor layer; and a processor configured to control the power supply device to selectively vary a frequency or a voltage magnitude of the alternating current power provided to the filter.

The processor may be configured to control the power supply device so that alternating current power having a frequency and a voltage magnitude corresponding to a selected size of a trapping material, based on the selected size of the trapping material.

The processor may be configured to: control the power supply device so that the plurality of holes supply first alternating current power having an attractive force for a target object in a trapping mode of the air conditioning apparatus, and control the power supply device so that the plurality of holes supply second alternating current power having a repulsive force for the target object in a discharge mode of the air conditioning mode.

The air conditioning apparatus may further include a sensor configured to detect a size of particles in air, wherein the processor is configured to control the power supply device so that alternating current power corresponding to the size of the particles detected by the sensor is provided to the filter.

The air conditioning apparatus may further include a user interface device configured to receive a selection for a trapping material, wherein the processor is configured to control the power supply device so that alternating current power corresponding to the trapping material selected through the user interface device is provided to the filter.

The plurality of holes may be arranged in a matrix form and have the same area.

Each of the plurality of holes may have an area of 50 $nm^2$ to 10,000 $\mu m^2$.

The power supply device may provide alternating current power having a voltage magnitude within the range of 1 V to 50 V to the filter according to a thickness of a nano-gap or the size and type of target particles.

The filter may be mounted interchangeably in the air conditioning apparatus.

A plurality of the filters may be provided in a moving direction of air.

The plurality of filters may include: a first filter including a plurality of holes; and a second filter including a plurality of holes disposed to coincide with or alternate with the plurality of holes of the first filter.

The plurality of filters may include: a first filter including a plurality of holes of a first size; and a second filter including a plurality of holes smaller than the first size and secondary filtering air filtered through the first filter.

The filter may further include an additional insulating layer and an additional conductor layer having a thickness in the range of 5 nm to 1000 nm that are sequentially stacked on the second conductor layer.

Because the filter for trapping particulate matter and the air conditioning apparatus having the same according to the disclosure use a dielectrophoresis principle, it is possible to efficiently trap and reduce particulate matter particles in a wider size range without a problem of performance degradation due to severe decompression in conventional filter type purification apparatus or a problem of generation of ozone that is harmful to the human body during the pretreatment of ionizing substances to be trapped accompanying the electric precipitation type purification apparatus, and it is possible to provide a filter that may be recycled and reused with a simple method of cleaning with water.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
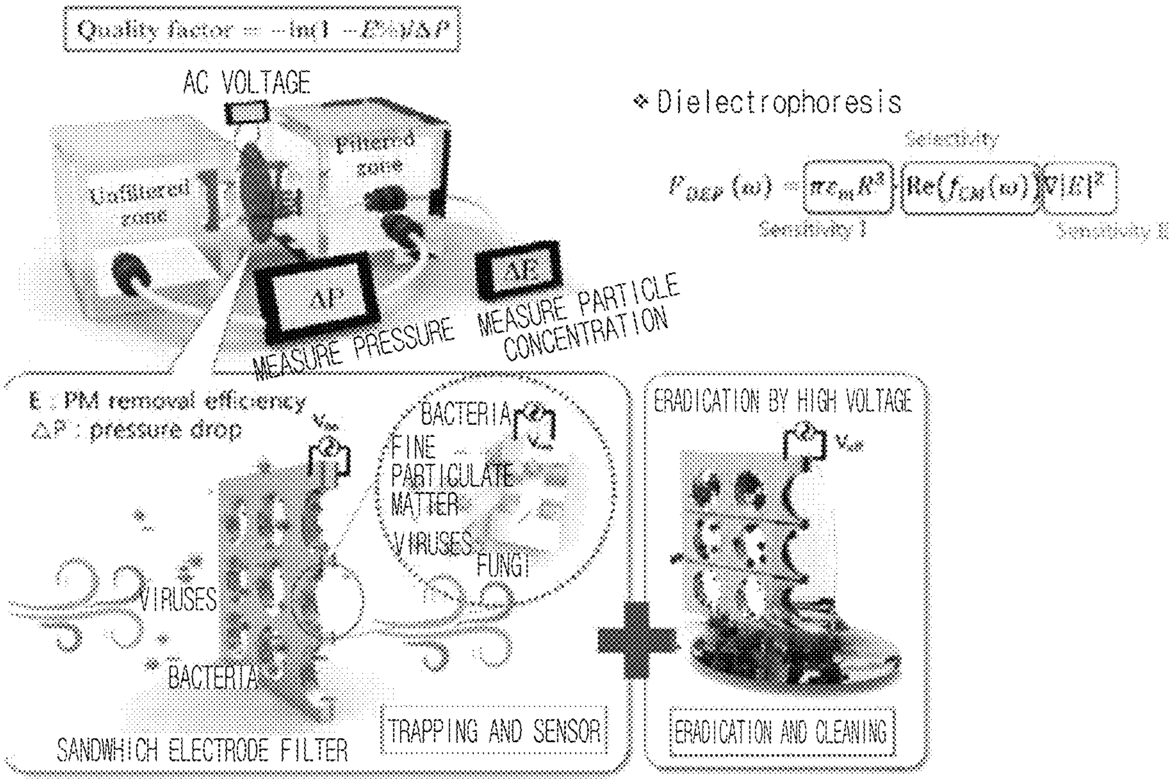
FIG. 1 is a view schematically illustrating an apparatus for particulate matter collection experiment using an electrode pair and an operating principle thereof according to an embodiment of the disclosure.

It should be understood that the embodiments described below are illustratively shown to help understanding of the disclosure, and that the disclosure may be implemented in various modifications, unlike the embodiments described herein. However, in the following description of the disclosure, when it is determined that a detailed description of related known functions or components may unnecessarily obscure the subject matter of the disclosure, the detailed description and specific illustration will be omitted. Further, the accompanying drawings are not illustrated to scale, but sizes of some of components may be exaggerated to help the understanding of the disclosure.

The terms used in the specification and claims have chosen generic terms in consideration of the functions of the disclosure. However, these terms may vary depending on the intentions of the artisan skilled in the art, legal or technical interpretation, and emergence of new technologies. In addition, some terms are arbitrarily chosen by the applicant. These terms may be interpreted as meanings defined in the specification, and may also be interpreted based on the general contents of the specification and common technical knowledge in the art without specific term definitions.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In addition, in the specification, components necessary for description of each embodiment of the disclosure are described, and thus are not necessarily limited thereto. Therefore, some components may be changed or omitted, and other components may be added. In addition, the components may be disposed to be distributed in different independent apparatuses.

Further, hereinafter, embodiments of the disclosure will be described in detail with reference to the accompanying drawings and the contents described in the accompanying drawings, but the disclosure is not limited to or limited by the embodiments.

Hereinafter, the disclosure will be described in more detail with reference to the accompanying drawings.

The present disclosure is to propose a new type of filter that compensates for the disadvantages of a filter type purification apparatus and an electric precipitation type purification apparatus that are commercialized in designing a filter for an apparatus for reducing particulate matter, which is a recent issue.

Specifically, the filter type purification apparatus is an apparatus that operates by a strainer method that physically filters pollutants through a mechanical structure, and due to such characteristics, a large pressure drop ($\Delta P$) is inevitable before and after the filter for efficient air quality improvement and there is a disadvantage that the function is deteriorated accordingly.

On the other hand, the electric precipitation type purification apparatus that uses a method of attaching particles to a charged strainer through electrical adsorption using electrostatic force has high dust collection efficiency and low decompression, but a process of ionizing the particles to be trapped is essential, and there is a problem of generating ozone harmful to the human body during such a process. Furthermore, all of the apparatuses may not be reused and need to be replaced periodically, resulting in maintenance costs. Therefore, the disclosure is based on the discovery of a filter capable of selectively trapping particles, which uses the principle of dielectrophoresis as a method for overcoming the disadvantages of the apparatuses.

The disclosure provides a filter for trapping particulate matter, including a vertical nano-gap electrode having a plurality of holes and driven by a dielectrophoresis method.

Here, the filter may include a layered structure including a first conductor electrode, an insulator layer having a constant thickness selected in the range of 5 nm to 1000 nm, and a second conductor electrode that are sequentially stacked, and both electrodes and the insulator layer including one or more holes spaced apart from each other in the same size and shape.

For example, each of the first conductor electrode and the second conductor electrode may be independently in the form of a film formed of a material of a metal selected from the group consisting of copper, gold, silver, platinum and palladium, alloys or composites containing one or more metals selected from the group consisting of copper, gold, silver, platinum and palladium, and one or more materials selected from the group consisting of graphite, tellurium, tungsten, zinc, iridium, ruthenium, arsenic, phosphorus, aluminum, manganese, and silicon, a conductive carbon material selected from the group consisting of graphite, graphene, and derivatives thereof, or mixed metal oxides selected from the group consisting of indium tin oxide (ITO), titanium oxide ($TiO_2$), ruthenium oxide ($RuO_2$), iridium oxide ($IrO_2$), and platinum oxide ($PtO_2$), but is not limited thereto. Here, the conductor electrode may be referred to as an electrode, a conductive layer, a metal layer, or the like.

The insulator layer may be formed using a non-conductive material having insulating properties without limitation. For example, the insulator layer may be formed of a metal oxide such as $SiO_2$, $Nb_2O_5$, $TiO_2$, $Al_2O_3$, or MgO, or a polymer such as polyvinylpyrrolidone (PVP), but is not limited thereto. As long as the insulator layer may be formed with a uniform thickness at a desired level, the type of material and the thickness of the formed layer are not limited.

However, due to morphological characteristics of a pair of electrodes of the disclosure, selective etching of the insulator layer is required in the manufacturing process, and therefore, when a material for the insulator layer is selected according to a process to be used, or, on the contrary, when a specific material is selected as the material for the insulator layer, the manufacturing process may be designed accordingly. For example, when a polymer film is included as the insulator layer, a pattern may be formed by etching the polymer film easily by treating the polymer film with a corrosive agent selected according to the type of polymer, for example, a specific solvent or a dry etching method.

When the thickness of the insulator layer is less than 5 nm, the entire filter made of a layered structure behaves like a single conductor due to the 'tunneling effect' in which electrons are transferred regardless of the presence or absence of an insulator as a distance between the first and second conductors located on both surfaces of the insulator layer becomes close, and the first conductor layer and the second conductor layer are no longer difficult to operate as separate electrodes.

Therefore, the thickness of the insulator layer is determined as a minimum thickness according to the characteristics of the insulator layer that does not allow the tunneling effect, which may be different depending on the material of each electrode and the insulator layer selected. On the other hand, when the thickness of the insulator layer exceeds a nano level and reaches a micrometer level, for example, when the thickness of the insulator layer exceeds 1000 nm, an available voltage required for effective particle trapping increases, which causes bubbles in the fluid or excessive heat generation of a reaction system, and thus the dielectrophoresis effect, efficiency, and/or sensitivity may be significantly reduced.

As described above, considering that the dielectrophoresis effect is a phenomenon caused by a non-uniform electric field, and the pair of electrodes of the disclosure exhibits the dielectrophoresis effect due to the non-uniform electric field formed by one electrode, which is a continuous plane, and the other electrode in which holes spaced parallel to each other by an insulator layer of an nm level are formed, that is, opposing electrodes of different types, as the thickness of the insulator layer increases, defects due to the holes are relatively small, and thus the reduction in the dielectrophoresis effect may be induced accordingly.

Therefore, it is obvious to those skilled in the art that the thickness of the insulator layer and/or the size of the hole may be organically adjusted in consideration of the size of the particles to be trapped or dispersed introduced into the insulator layer and/or hole.

Specifically, the filter may be manufactured with a large area of several $cm^2$ or more, preferably sub-$m^2$, and because the filter includes holes formed from as few as several to several hundred to as many as several million or more by adjusting the size of the holes and the spacing between the holes included in the filter, the filter may control the particles according to the size with an equal and/or uniform force, for example, selectively trap the particles according to the size by using such holes.

For example, each of the holes may independently exhibit deterioration in performance due to pressure-drop that appears in the filter type apparatus having an area of 50 $nm^2$ to 10,000 $\mu m^2$, and when the area of an individual hole exceeds 10,000 $\mu m^2$, there may be a number of voids where the electric field does not exist, which may adversely affect filtration performance.

The plurality of holes may be arranged in a matrix form, and all may have the same size. In addition, each hole may have a different size. For example, when the plurality of holes are arranged in a plurality of columns and rows, holes of the first size are arranged in one column, holes of different sizes are arranged in the second column, and the like.

In addition, the hole may have a circular cross section or a polygonal shape such as a hexagon.

In the disclosure, the term "dielectrophoresis (DEP)" refers to a phenomenon in which a force is applied to a dielectric particle when placed in a non-uniform electric field, and such a force does not require charging of the particle, and all particles may exhibit dielectrophoresis activity in the presence of the electric field.

At this time, strength of the applied force, that is, a force of dielectrophoresis (FDEP), depends on a frequency of the electric field, a medium containing the particles, electrical properties of the particles themselves, and the shape and size of the particles. Therefore, the particles may be adjusted using an electric field of a specific frequency, for example, the orientation and/or behavior of the particles may be adjusted.

Describing dielectrophoresis theoretically, the force of dielectrophoresis (FDEP) received when a particle is placed in a medium to which an alternating current of frequency ω is applied, for example, a fluid, may be expressed by the following Mathematical expression.

$$F_{DEP}(\omega) = \pi\varepsilon_m R^3 \cdot \mathrm{Re}(f_{CM}(\omega))\nabla|E|^2 \quad \text{[Mathematical expression 1]}$$

In the Mathematical expression described above, ω is the frequency of alternating current applied to a pair of dielectrophoresis electrodes, $\varepsilon_m$ is a dielectric constant of the fluid (medium) surrounding the particle, R is the radius of the particle, E is the size of the electric field, and $\mathrm{Re}(f_{CM}(\omega))$ is the real part of the Clausius-Mossotti (CM) function for the frequency of the applied alternating current. In the Mathematical expression described above, a factor that determines a sign of the force of dielectrophoresis applied to the particle is the real part of the Clausius-Mossotti (CM) function, which may be calculated by Mathematical expression 2 below.

[Mathematical expression 2]

$$f_{CM}(\omega) = \frac{\varepsilon_p^*(\omega) - \varepsilon_m^*(\omega)}{\varepsilon_p^*(\omega) + 2\varepsilon_m^*(\omega)}$$

At this time, ω is the frequency of alternating current applied to the pair of dielectrophoresis electrodes, $\varepsilon^*_p$ is a dielectric constant of the particles to be trapped, and $\varepsilon^*_m$ is a dielectric constant of the fluid.

If the dielectric constant of the particle under the alternating current of the frequency ω is greater than that of the medium, the Clausius-Mossotti function has a positive Clausius-Mossotti value, that is, $\mathrm{Re}[f_{CM}]>0$, and the DEP at this time is called positive DEP, and in this state, the particles move toward a larger electric field gradient. Conversely, if the dielectric constant of the particle is smaller than that of the medium, the Clausius-Mossotti function has a negative Clausius-Mossotti value, that is, $\mathrm{Re}[f_{CM}]<0$, and the DEP at this time is called negative DEP, and in this state, the particles move toward a smaller electric field gradient.

As described above, by applying the alternating current power having a specific frequency, the behavior of specific particle may be adjusted by dielectrophoresis, and in order to apply such a behavior to the trapping of the particular matter, the first conductor electrode and the second conductor electrode of the filter for particular matter trapping of the disclosure may include a circuit electrically connected together with an alternating current power supply device.

In the disclosure, the term "particulate matter (PM)" is also referred to as particles and refers to dust, which is particles that are small enough to be invisible. The particulate matter (PM) is an air pollutant including sulfurous acid gas, nitrogen oxides, lead, ozone, carbon monoxide, and the like, and may contain all fine dust that occurs in automobiles and factories and floats in the air for a long time.

The particulate matter (PM) is academically called aerosol, is called by various names such as suspended particles and particulate matter, and has a slightly different meaning depending on the name. The particulate matter (PM) may be subdivided into: particles (PM10) having a size of 10 μm or less that are collectively referred to as particulate matter, particles (PM2.5) having a size of 2.5 μm or less that are referred to as fine particulate matter, particles (PM1.0) having a size of 1.0 μm or less that are referred to as ultra particulate matter, and particles (PM0.3) having a size of 0.3 μm or less that are referred to as ultra-fine particulate matter.

It was reported that the particulate matter causes various allergic diseases such as allergic conjunctivitis, keratitis, and rhinitis, respiratory diseases such as bronchitis, emphysema, and asthma, as well as skin diseases, cardiovascular diseases through capillaries, eye diseases, and brain diseases, and the particulate matter having a size of about 1 μm or more penetrates into the bronchi, but particles of 0.1 μm to 1 μm smaller than 1 μm may reach an alveoli, which may have a fatal effect on the human body. Therefore, it is a very important issue to remove the particulate matter, in particular, ultra particulate matter and ultra-fine particulate matter having the size of 1 μm or less.

For example, particulate matter that may be trapped using the filter according to the disclosure may be a particle having an average diameter of 50 nm to 10 μm, which is a precursor level. As described above, by adjusting the frequency of the alternating current applied to the filter, it is possible to selectively adjust the trapping according to the size of the particles to be trapped, and thus the size of the particles that may be trapped using such a trapping may be very wide. In addition, a size range of the particles that may be trapped by the selected frequency may be somewhat limited, but by independently applying the alternating current of different frequencies to the filters placed parallel to each other, particles of different size ranges may be trapped from each filter, and thus the size range of particulate matter that may be reduced by using an apparatus including such filters is wide.

Meanwhile, in the hereinabove, the filter of the disclosure is expressed as trapping the particulate matter, but it is also possible to trap viruses, bacteria, fungi, and the like.

The filter according to the disclosure may be manufactured through a process including a first step of preparing a layered structure including a first conductor layer, an insulator layer having a constant thickness selected in the range of 5 nm to 1000 nm, and a photosensitive resin layer having a pattern designed, a second step of selectively etching the insulator layer, the second conductor layer, and the photosensitive resin layer according to the designed pattern by etching, and a third step of removing the remaining photosensitive resin layer. For example, the manufacturing method may be performed by combining methods of stacking and etching various materials known in the art. A specific method of performing each step may be selected according to the material of each selected layer.

For example, the step of etching may be performed using a dry and/or wet etching method. If each constituent layer is formed of a known material and thickness, the dry etching method may be selected, and at this time, an execution time may be determined in consideration of an etching rate of each layer according to the selected method.

On the other hand, in the case of including a polymer film such as PVP as the insulator layer, in consideration of the fact that only the polymer film may be selectively removed, the dry etching method may be selected. Alternatively, if necessary, a complex method of etching the second conductor layer by the dry etching method and the insulator layer by the dry etching method may be used, but the etching method is not limited thereto. The etching method may be selected in consideration of the material of each constituent layer, the etching method known in the art, and/or the convenience and economy of performing the process.

In addition, another method of manufacturing a layered structure and a pair of dielectrophoresis electrodes according to the disclosure may include a first step of preparing the layered structure including a first conductor layer, an insulator layer having a constant thickness selected in the range of 5 nm to 1000 nm, a second conductor layer, and a photosensitive resin layer having a desired pattern designed on a substrate with holes drilled in a desired pattern, and a second step of forming a second conductor layer to be spaced apart from the first conductor layer by the insulator layer and the photosensitive resin layer on the layered structure. When the photosensitive resin layer is not used, the first conductor layer may be achieved through one-time deposition using a conductor deposition method in which convenience and/or economy are considered complexly by performing a deposition method and/or process known in the art on the substrate having the holes already drilled in the desired pattern.

Thereafter, in the same manner as in the above-described manufacturing method, the insulator layer having the constant thickness selected in the range of 5 nm to 1000 nm may be deposited and applied. At this time, as a deposition method that may be used, chemical vapor deposition may implement a pair of electrodes having an electrode-insulator-electrode structure of the disclosure.

In addition, the disclosure may provide an apparatus for reducing particulate matter including one or more filters including a first conductor electrode, an insulating layer, and a second conductor electrode which are sequentially stacked, and both electrodes and the insulator layer include one or more holes spaced apart from each other in the same size and shape.

At this time, the above-described apparatus may include a suction portion that sucks unfiltered air and a discharge portion that discharges air with reduced particulate matter by the filters, the suction portion and the discharge portion being separated by the filter(s).

Further, the first conductor electrode and the second conductor electrode of the filter included in the apparatus for reducing particulate matter according to the disclosure may include a circuit electrically connected with a power supply device.

At this time, the alternating current applied through the power supply device may derive a Clausius-Mossotti (CM) curve according to the frequency of the applied alternating current for the particulate matter particles to be trapped using Mathematical expression 2 described above, and may have a frequency selected from a range in which the real part of the Clausius-Mossotti function in the derived curve represents a positive value.

For example, the alternating current power may have a frequency of 10 kHz to 10 MHz and a low voltage in the range of 0.1 to 20 V, but is not limited thereto.

In addition, the apparatus for reducing particulate matter according to the disclosure may further include a means for applying a high voltage to the filter so as to eradicate fungi or viruses trapped therein.

Further, the apparatus for reducing particulate matter according to the disclosure may further include a means for cleaning a filter. For example, a filter in which the particulate matter is trapped may be easily cleaned with water, and may be dried and reused after cleaning.

For example, the apparatus for reducing particulate matter according to the disclosure may include two or more filters positioned parallel to each other between the suction portion and the discharge portion. For example, a first filter and a second filter may be provided in a moving direction of air, the first filter may have a plurality of holes having a first size, and the second filter may have a plurality of holes having a second size smaller than the first size. Such filters may be interchangeably mounted in the air conditioning apparatus.

Meanwhile, in the implementation, the apparatus for reducing particulate matter may use a plurality of filters having holes of the same size, and at this time, the holes of each filter may have a different arrangement. That is, the trapping effect may be increased by providing alternate arrangements of holes in which the air passing through the holes of the first filter does not pass directly to the holes of the second filter.

Figure 2:
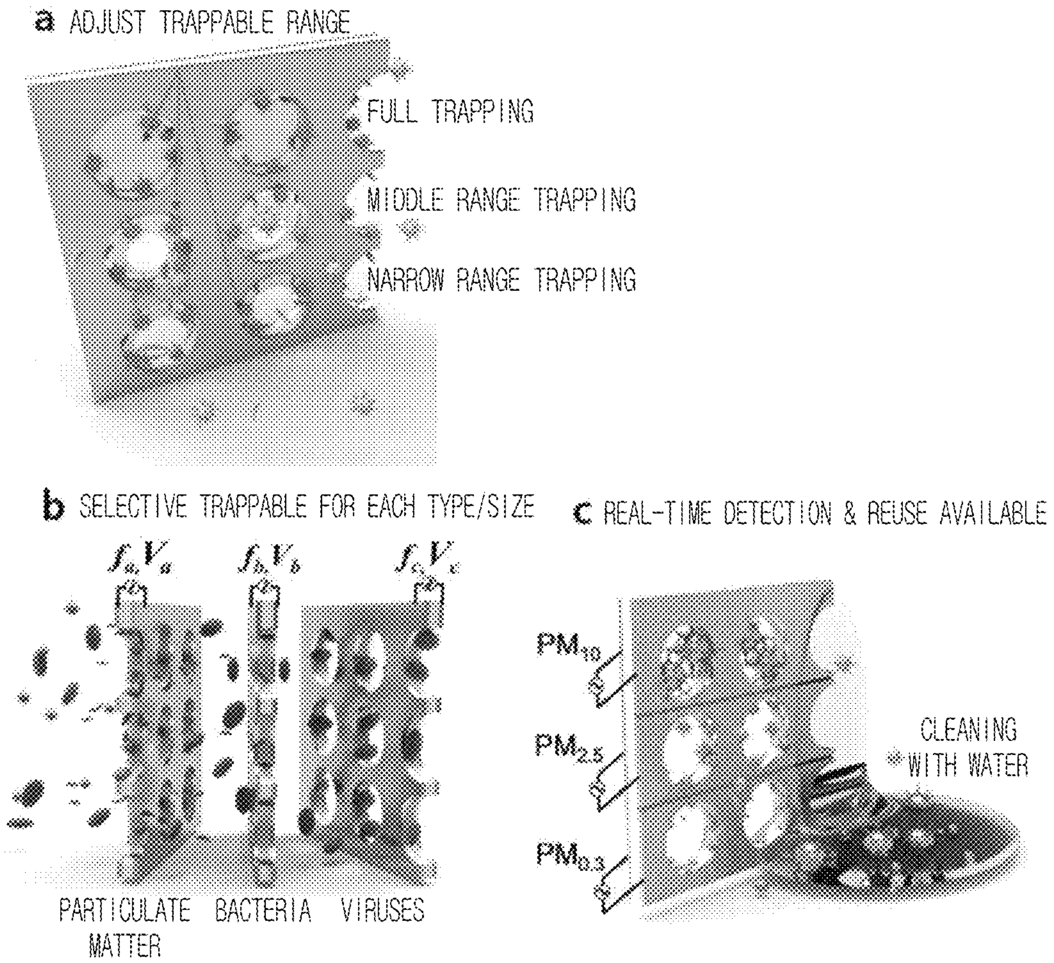
FIG. 2 is a view schematically illustrating a) a method for collecting particulate matter using a pair of electrodes, b) a sequential trapping method according to a particle size using a series of pairs of electrodes, and c) principles of removing trapped particles through cleaning and reusing the electrodes according to an embodiment of the disclosure.

Further, the plurality of filters may be connected to the power supply device provided so as to independently apply the alternating current of different frequencies. As described above, by applying the alternating current of different frequencies to two or more filters provided in the apparatus and passing air containing the particulate matter in sequence, particles of various size ranges may be sequentially trapped. The principle of such stepwise particle trapping is illustrated in FIG. 2.

For example, by arranging holes of different sizes in one filter structure, one filter may perform a trapping operation with each other, and by sequentially arranging a plurality of filters having holes of different sizes in the moving direction of air, different objects such as particulate matter, bacteria, viruses, and fungi may be trapped. At this time, the power supply device may provide alternating current power corresponding to each object for each filter.

In addition, the disclosure may provide an air conditioning apparatus including one or more filters for trapping particulate matter, including a vertical nano-gap electrode having a plurality of holes and driven by a dielectrophoresis method, as functional filters.

Specifically, in the filter for trapping particulate matter, the vertical nano-gap electrode includes a first conductor electrode, an insulator layer having a constant thickness selected in the range of 5 nm to 1000 nm, and a second conductor electrode that are sequentially stacked, the both electrodes and the insulator layer include one or more holes spaced apart from each other in the same size and shape, and at this time, the air conditioning apparatus may include a suction portion that sucks unfiltered air and a discharge portion that discharges air having reduced particulate matter by the filter, the suction portion and the discharge portion being separated by the filter(s).

The material and/or structure of the first conductor electrode, the second conductor electrode, and the insulator layer are as described above.

For example, the filter for trapping particulate matter of the disclosure may be used in place of the functional filter used in the air conditioning apparatus. By using the filter for trapping particulate matter of the disclosure, it is possible to solve the problem of rapid pressure-drop before/after the filter that occurs when using the HEPA filter, or it is possible to solve the problem of generating ozone, which is harmful to the human body when using an electrostatic filter. In addition, because these existing filters may not be reused, periodic replacement is inevitable, resulting in high maintenance costs, whereas the filter for trapping particulate matter of the disclosure may be reused by simply cleaning and drying, and thus has an advantage of being able to use for a long time.

Alternatively, the air conditioning apparatus according to the disclosure may further include one or more of a pretreatment filter positioned between the suction portion and the filter for trapping particulate matter, a deodorization filter positioned between the filter for trapping particulate matter and the discharge portion, and the HEPA filter so as to be parallel to the filter for trapping particulate matter according to the disclosure.

As such, by using the filter for trapping particulate matter according to the disclosure in combination with the existing pretreatment filter, the deodorization filter, and/or the HEPA filter, it is possible to provide an economical and highly efficient air conditioning apparatus capable of overcoming the disadvantages of the above-described existing filters and more efficiently removing the particulate matter. A detailed configuration and operation of the air conditioning apparatus using the filter according to the disclosure will be described later with reference to FIG. 18.

Further, the disclosure provides a method for reducing particulate matter using the apparatus, the method includes sucking air containing particulate matter through a suction portion and bringing the sucked air into contact with a filter to which an alternating current of a predetermined frequency is applied, and discharging air having reduced particulate matter transmitted through the filter to the outside through a discharge portion. At this time, the method may further include eradicating fungi or viruses trapped in the filter by applying a voltage of 10 V to 50 V to the filter based on a pair of electrodes separated by an insulating layer having a thickness of 100 nm to show an antibacterial effect, but is not limited thereto.

Considering that a conventional sterilization apparatus exhibits antibacterial activity by applying the voltage of 300 V to 500 V for about 10 to 30 minutes, more efficient sterilization effects may be expected with a significantly lower voltage.

In addition, to improve the efficiency of reducing particulate matter before or after use, a step of cleaning the filter may be additionally performed. The principle of reuse of the filter through cleaning is as described above.

Hereinafter, a manufacturing operation of the above-described filter will be described in detail.

MANUFACTURING EXAMPLE 1

Manufacturing of Large-Area Vertical Nano-Gap Array Having Patterned Holes in One Surface and Having Both Surfaces Spaced Apart from Each Other by $SiO_2$ 1-1. Vertical Nano-Gap Array Including $SiO_2$ as Insulator After forming an ITO layer having a thickness of 40 nm on a glass substrate patterned having an area of 1 cm×1 cm in an area of 4 mm×4 mm, a $SiO_2$ layer having a thickness of 100 nm was deposited using a plasma-enhanced chemical vapor deposition (PECVD) apparatus. Thereafter, a gold (Au) layer having a thickness of 100 nm was formed on the $SiO_2$ layer by a thermal evaporator. Then, a photosensitive resin (AZ1512, Microchemical) was spin coated and heated to form a photosensitive resin layer. A photomask having an array pattern in which a series of holes having a diameter of 10 μm are arranged at intervals of 30 μm was placed on the surface on which the photosensitive resin layer was formed, and the photomask was irradiated with ultraviolet rays and then developed to remove the unmasked portion.

The second conductor layer and the insulator layer exposed under the hole pattern were etched in the same shape as the pattern by performing inductively coupled plasma (ICP) etching on the layered structure in which the hole array pattern is formed with the photosensitive resin, as described above. When etching through the ICP etching, the etching rate is different in gold constituting the second conductor layer and $SiO_2$ constituting the insulator layer, and therefore, the treatment time was calculated in consideration of the thickness of each of the layers and the etch rate of the material so that the first insulator layer is maintained but the second conductor layer and the insulator layer may be selectively removed.

Specifically, in the case of $SiO_2$ etching by ICP etching, etching was performed under conditions of about 230 nm/sec at 5 mTorr pressure of helium with ICP 2700 W and 75 W of bias at 4 mTorr pressure under 15 sccm of argon gas and 90 sccm of $CHF_3$ gas. Meanwhile, in the case of the gold (Au) layer, etching was performed under conditions of about 130 nm/sec at 5 mTorr pressure of helium with ICP 1000 W and 150 W of bias at 0.5 mTorr pressure under 8 sccm of argon gas and 4 sccm of $Cl_2$ gas.

1-2. Vertical Nano-Gap Array Including PVP as Insulator

An insulator layer having 110 nm made of PVP was formed by spin coating and heating a polyvinylphenol (PVP) solution on a glass substrate in which an ITO layer having a thickness of 180 nm was patterned in an area of 1 cm×1 cm. Then, a photosensitive resin (AZ1512) was spin coated and heated on the PVP layer to form a photosensitive resin layer.

A photomask having an array pattern in which a series of holes having a diameter of 10 μm are arranged at intervals of 30 μm was placed on the surface on which the photosensitive resin layer was formed, and the photomask was irradiated with ultraviolet rays and then developed to remove the unmasked portion. A gold thin film having a thickness of 120 nm was formed on the patterned surface of the stacked structure including the patterned photosensitive resin layer by thermal evaporation. Thereafter, treatment with acetone was performed to remove the remaining photosensitive resin pattern and unnecessary gold thin film formed on the surface thereof, and a gold thin film layer having a hole array pattern was obtained. Furthermore, portions of the PVP insulator layer exposed to holes that are not covered by the mask by using a patterned gold thin film as the mask by treating at 150 W for 2 minutes and 15 seconds through reactive ion etching using oxygen gas at a flow rate of 100 sccm at 100 mTorr pressure were selectively removed.

1-3. Analysis of Shape of Vertical Nano-Gap Array

An electrode pair including one electrode and the other electrode having an array pattern of a plurality of holes formed thereon, which are each manufactured with an area of several $mm^2$ and several $cm^2$, formed continuously, and spaced apart by a nano-gap made of an insulator, were magnified and observed with the naked eye and with a microscope. Furthermore, a micro-hole array pattern and a cross section were observed by SEM to confirm an existence thereof.

MANUFACTURING EXAMPLE 2

Manufacturing of a Large-Area Vertical Nano-Gap Array Having an Open Hole Structure Symmetrically Formed by a Roll-to-Roll or Nano-Imprint Method To develop the proposed large-area nano-gap electrode filter, a process of manufacturing a large-area polymer frame in which regular micro-sized holes as a basic structure are drilled was first confirmed. As the basic principle of manufacturing the polymer frame in which the holes are drilled, a phenomenon in which UV curing is delayed was used by locally controlling the concentration of oxygen contained in the UV curable polymer using polydimethylsiloxane (PDMS), which is a gas-permeable polymer structure.

Specifically, after contacting a PDMS microstructure coated with the UV-curable material with a PDMS flat surface, UV irradiation was applied to perform curing, but the treatment time was adjusted to manufacture the polymer frame in which single-scale microholes are drilled. In addition, a multi-scale structure is manufactured using the same principle, and by positioning a PDMS microstructure at a lower portion, and positioning a PDMS nanostructure in contact with a corresponding position at an upper portion to adjust a UV curing time, a multi-scale polymer frame was formed in which the microstructure supports a membrane in which the nano holes are drilled.

By expanding and applying using the above-described polymer frame manufacturing method, in the case of the single scale, the membrane having micro-sized holes adjusted in a wide range such as 500 μm, 50 μm, and 10 μm was formed, and in the case of the multi-scale frame in which the nano-membrane is supported with a micro support in which the nano holes are drilled, by adjusting the size of the hole in the range of several hundred nm to several hundred μm to form a structure in a wide range of combinations, the desired shape suitable for the purpose was designed and manufactured and used.

Meanwhile, hereinabove, although the filter configured with a three-layer structure in which the first conductor electrode, the insulator layer, and the second conductor electrode are sequentially stacked has been described, in implementation, an additional insulator layer and an additional conductor electrode may be disposed after the second conductor electrode. Through such a structure, an effect of stacking a plurality of filters may be achieved. In addition, in addition to the above-described configuration, an insulating layer or a coating layer for preventing corrosion of the electrode may also be provided.

EXAMPLE 1

Trapping and Dispersion of Microparticles Using Dielectrophoresis Method

In the disclosure, to visually confirm the trapping of microparticles by the dielectrophoresis method using a pair of vertical nano-gap array electrodes, particle behavior according to a frequency was confirmed using a pair of electrodes prepared according to Manufacturing Example 1 in which one electrode surface is continuously formed.

First, before an actual experiment, a dielectrophoresis phenomenon was predicted through simulation.

A force acting on the particles by the dielectrophoresis phenomenon is determined by the conductivity of the material surrounding the particles, the dielectric constant, and the frequency of the applied alternating current voltage, which may be calculated according to Mathematical expression 1 above.

Figure 3:
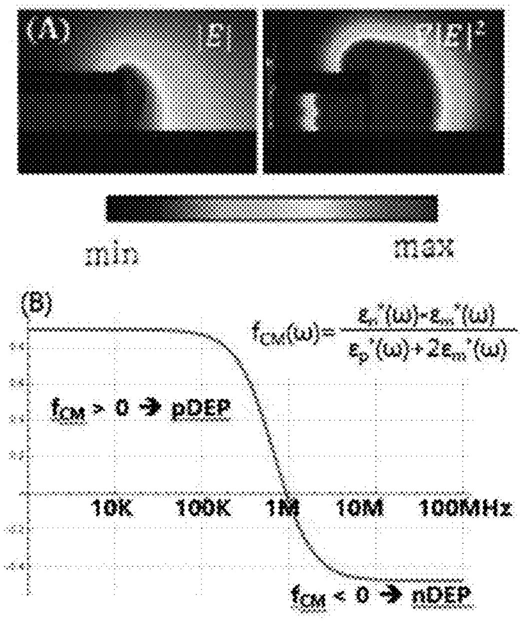
FIG. 3 is a view illustrating (A) an electric field distribution in a pair of electrodes (patterned gold and ITO) spaced apart by PVP as an insulating layer and (B) the Clausius-Mossotti curve according to a frequency, derived by simulation for polystyrene particles with a diameter of 1 μm according to an embodiment of the disclosure.

When an alternating current voltage is applied to the pair of dielectrophoresis electrodes prepared according to Manufacturing Examples 1 and 2 described above, a distribution of the generated electric field is illustrated in FIG. 3A, and the Clausius-Mossotti function according to the frequency for the yeast bacteria having a size of 10 μm theoretically derived is illustrated in FIG. 3B. In the case of yeast bacteria, the Clausius-Mossotti value calculated by substituting the value obtained from a literature value was found to have characteristics thereof changed based on 1 MHz, and specifically, the Clausius-Mossotti value was a positive value at frequencies less than 1 MHz and a negative value at frequencies exceeding 1 MHz.

From the graph of FIG. 3B, when the force of dielectrophoresis applied to the particles when the alternating current voltage calculated through the above two Mathematical expressions is applied is linked with a motion of the particles, it was expected that particles subject to a positive force of dielectrophoresis move toward the electrode, whereas particles subject to a negative force of dielectrophoresis move toward an opposite direction of the electrode.

EXAMPLE 2

Trapping and Dispersion of Polystyrene Beads Using Dielectrophoresis Method

In the disclosure, particle trapping ability of a pair of electrodes manufactured according to Manufacturing Example 1 described above was confirmed using polystyrene (PS) particles having a diameter of 1 μm having a size of the level of ultra particulate matter to ultra-fine particulate matter, and similar in size and properties to virus particles.

To confirm whether the predicted result by theoretical calculation is actually possible to implement using the pair of dielectrophoresis electrodes of the disclosure, the behavior of particles in the fluid according to the frequency of alternating current was confirmed by taking a video after configuring the apparatus to contact a fluid (tertiary distilled water of 18.2 MΩ or more) containing polystyrene particles having a diameter of 1 μm on the surface of the pair of electrodes manufactured according to Manufacturing Example 1 on which the hole array pattern is formed and inducing the dielectrophoresis phenomenon by connecting alternating current power to the electrically connected electrode. Specifically, the behavior of the particles was measured by applying a voltage of 100 mV while changing the frequency to 100 kHz and 10 MHz to the apparatus having the pair of electrodes manufactured according to Manufacturing Example 1-1 and applying an alternating current of frequencies of 100 kHz and 1 MHz at a low voltage of 0.1 V to the pair of electrodes manufactured according to Manufacturing Example 1-2, and the results are illustrated in FIGS. 4 and 5, respectively.

Figure 4:
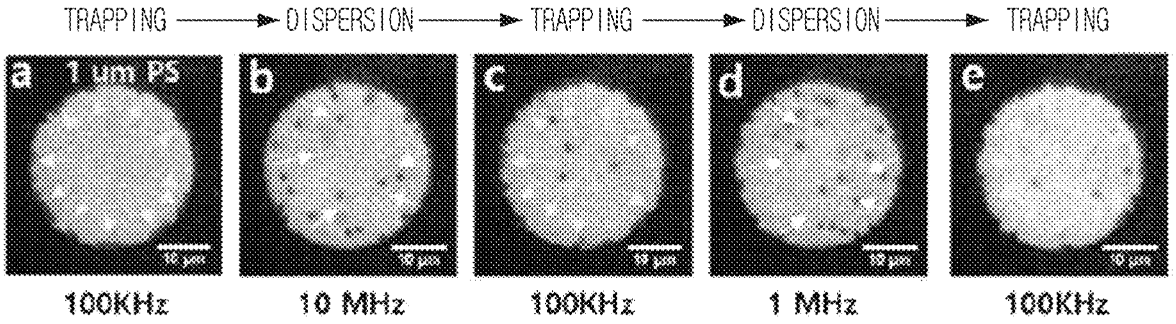
FIG. 4 is a view illustrating results obtained by repeatedly inducing the trapping and dispersion of particles by applying an alternating current voltage of 100 mV while changing the frequency to 10 MHz and 100 kHz, respectively, selected in the region where the Clausius-Mossotti value of the calculated curve is positive and negative.

As illustrated in FIG. 4, when the alternating current of 100 kHz is applied that will have a positive Clausius-Mossotti value, the particles were trapped in the hole by receiving the force of dielectrophoresis in the direction toward the electrode and arranged along an edge of the hole adjacent to the electrode, but when the alternating current of 10 MHz is applied that will have a negative Clausius-Mossotti value, the particles tended to disperse and move to the outside of the hole or to the center of the hole away from the electrode by receiving the force acting in the opposite direction, and this was observed repeatedly as the frequency was changed.

Figure 5:
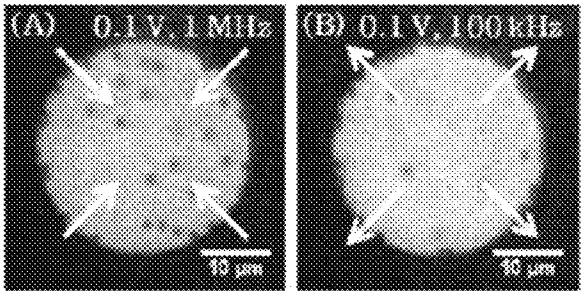
FIG. 5 is a view illustrating results obtained by inducing the dispersion and trapping of particles by applying an alternating current voltage of 100 mV while changing the frequency to (A) 100 kHz and (B) 1 MHz, respectively, selected in the region where the Clausius-Mossotti value of the calculated curve is positive and negative.
Figure 6:
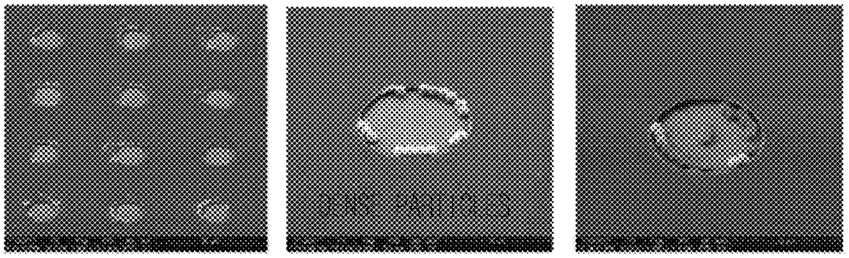
FIG. 6 is a view illustrating a result obtained by observing with SEM a process of trapping polystyrene particles having a diameter of 1 μm by applying an alternating current voltage of a frequency corresponding to a positive force of dielectrophoresis to patterned gold-ITO electrodes, spaced by a $SiO_2$ layer having a thickness of 100 nm according to an embodiment of the disclosure.
Figure 7:
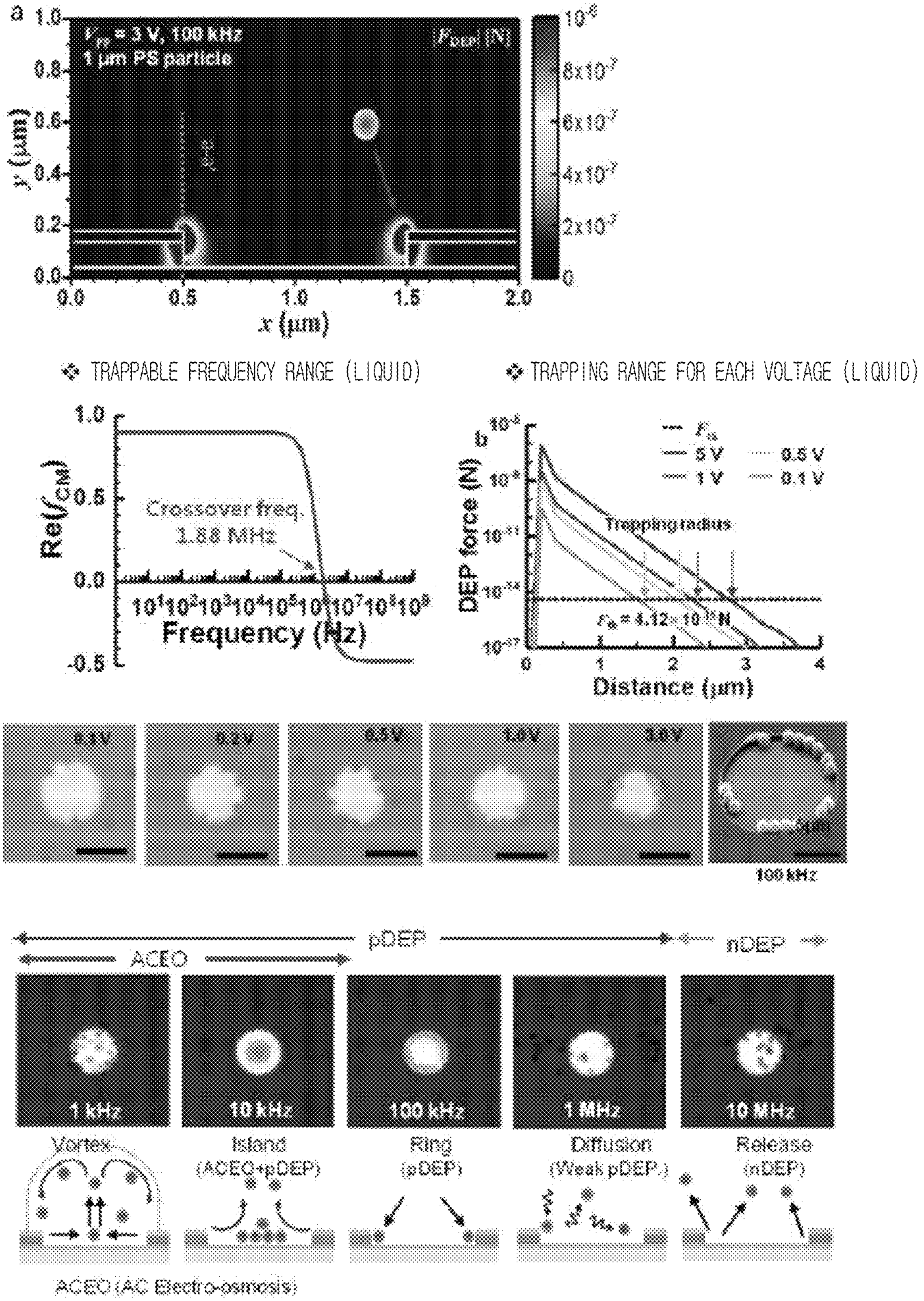
FIG. 7 is a view illustrating results obtained by observing an electric field distribution when an alternating current voltage of 3 V is applied at a frequency of 100 kHz to a patterned gold-ITO electrode spaced apart by a $SiO_2$ layer having a thickness of 100 nm, the Clausius-Mossotti curve according to a frequency, derived by simulation for polystyrene particles with a diameter of 1 μm, a trapping range according to a voltage, and a particle behavior according to a frequency according to an embodiment of the disclosure.

In addition, as illustrated in FIG. 5, in the pair of electrodes manufactured according to Manufacturing Example 1-2, similarly, when the alternating current of 100 kHz is applied that will have a positive Clausius-Mossotti value, the particles move in the direction of the electrode, that is, are arranged at a boundary surface of the hole and are trapped in the hole, whereas when the alternating current of 1 MHz, which has a Clausius-Mossotti value close to zero, is applied, the particles tended to be dispersed. This represents that the pair of electrodes manufactured according to the disclosure may trap the particles by the force of dielectrophoresis at a low voltage, and further, separate specific particles from a mixture of particles having different sizes and/or dielectric constants according to the above-described principle.

EXAMPLE 3

Trapping of Anthrax Bacteria Mimics Using Dielectrophoresis Method

To confirm whether the pair of electrodes of the disclosure may be applied to the trapping of biomaterials using the dielectrophoresis method, a sample containing *Bacillus subtilis*, which are anthrax bacteria mimics in place of the polystyrene particles, was used and tested in a similar manner to the experimental example described above.

Figure 8:
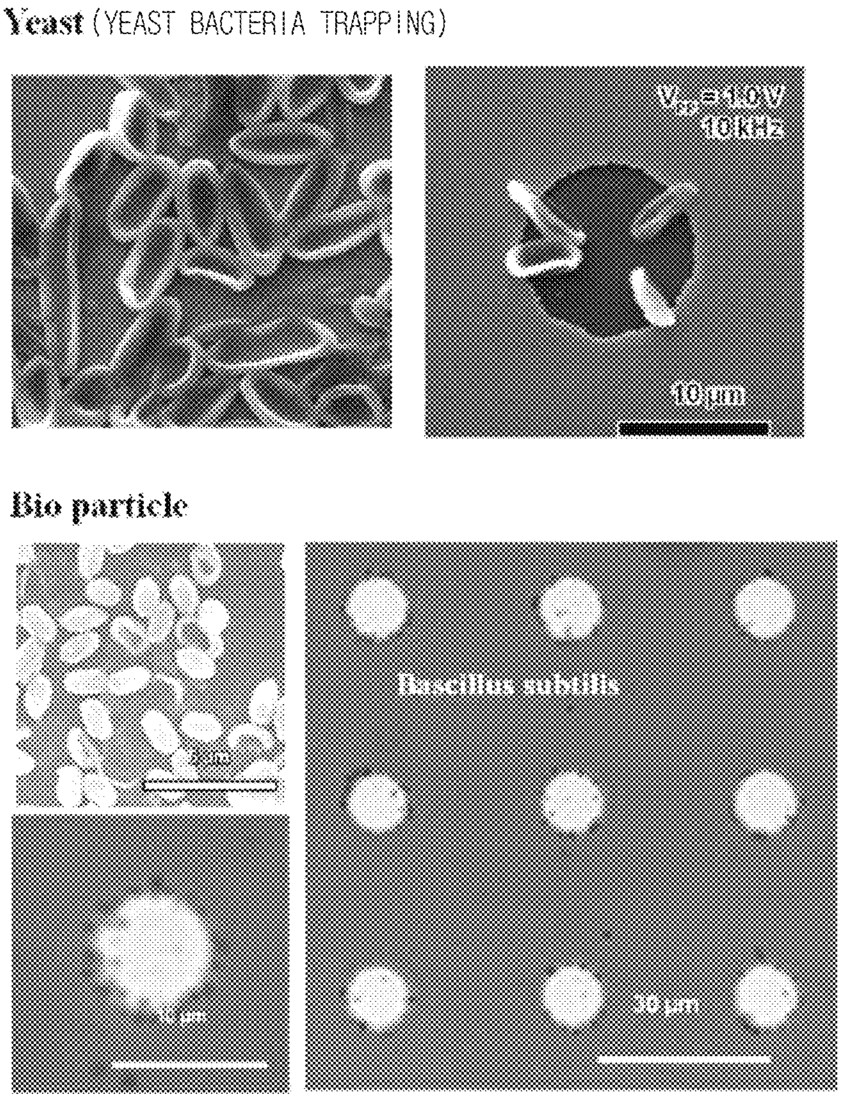
FIG. 8 is a view illustrating the trapping of yeast bacteria, which are biomaterials, using the patterned gold-ITO electrode according to an embodiment of the disclosure.

Specifically, *Bacillus subtilis* spores cultured at 37° C. for 16 to 20 hours were brought into contact with an apparatus including a pair of gold-ITO electrodes having a hole array having a diameter of 10 μm, an alternating current voltage of 3 V having a frequency of 100 kHz was applied, it was confirmed by SEM that bacteria were trapped in the hole of the electrode in the fluid, and the result was illustrated in FIG. 8. As illustrated in FIG. 8, when the alternating current voltage was applied, the *Bacillus subtilis* was trapped by the electrode and arranged along a boundary of the patterned hole. This indicates that it is possible to trap and/or separate actual biomaterials, such as bacteria, existing in the fluid by an electrophoresis method using the pair of electrodes of the disclosure.

EXAMPLE 4

Figure 9:
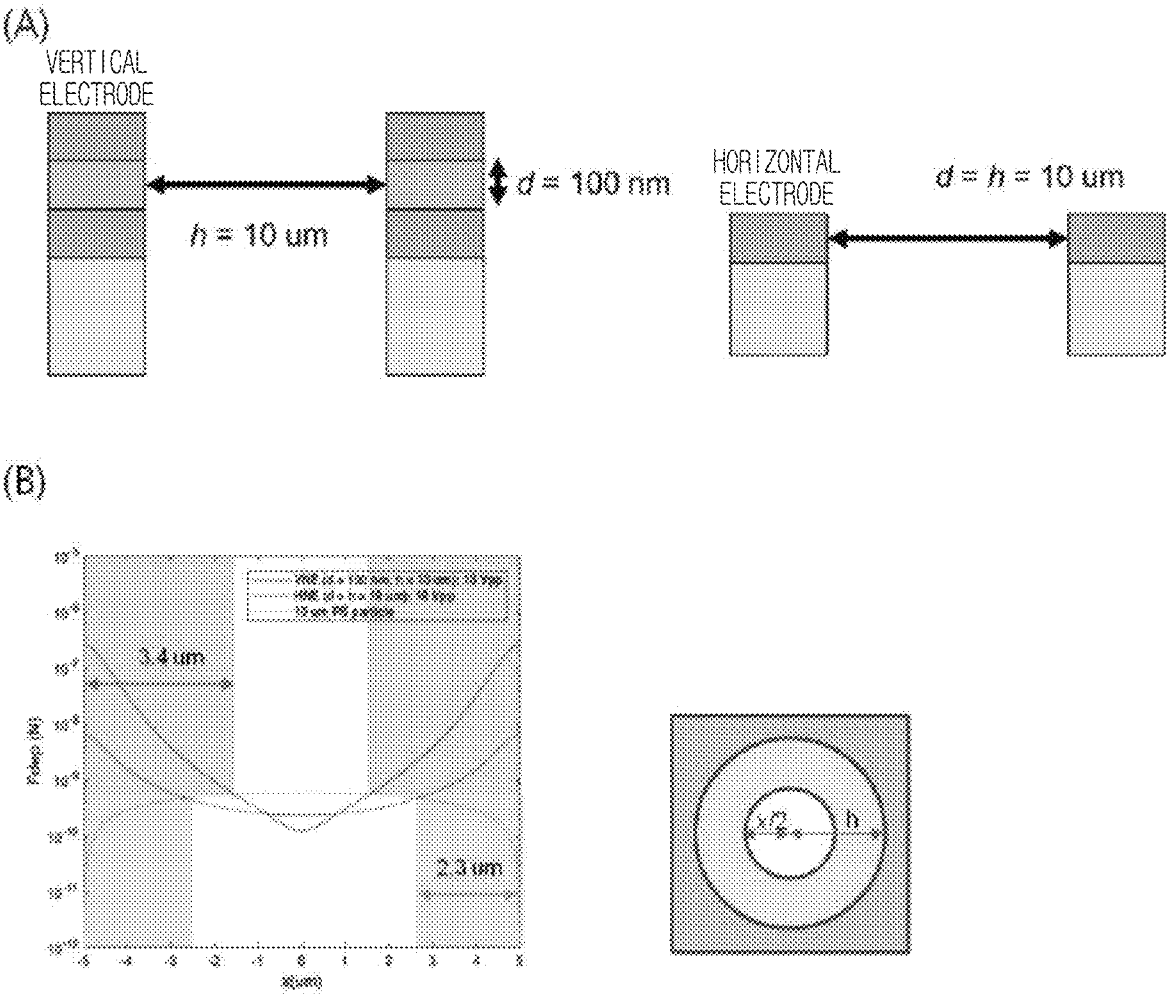
FIG. 9 is a view schematically illustrating (A) a vertical alignment nano-gap electrode including a hole having a diameter of 10 μm and having a pair of electrodes spaced apart by an insulating layer having a thickness of 100 nm and a horizontal alignment electrode manufactured to have a hole having a diameter of 10 μm manufactured in the same scale as the vertical alignment nano-gap electrode, and (B) a particle trapping range when a current of 10 Vpp is applied to both electrodes while flowing fine particulate matter precursor at a face velocity of 0.1 m/s according to an embodiment of the disclosure.

Simulation of Efficiency of Trapping Particulate Matter in Vertical Nano-Gap Electrode To confirm excellent particle trapping ability of the vertical nano-gap electrode to the horizontal electrode, particle trapping ranges were simulated when a current of 10 Vpp (peak-to-peak voltage) is applied under a flow of face velocity of 0.1 m/s to the vertical nano-gap electrode including a hole of a diameter of 10 μm and a pair of electrodes spaced apart by an insulating layer having a thickness of 100 nm, and the horizontal electrode manufactured to have a hole of a diameter of 10 μm manufactured in the same scale, and are illustrated in FIG. 9.

As illustrated in FIG. 9, it was confirmed that the vertical and horizontal electrodes including the holes formed with the same size of the diameter of 10 μm may effectively trap the particles within the range of 3.4 μm and 2.3 μm, respectively, from an outer periphery of the hole when a current of 10 Vpp is applied to both electrodes under a flow of face velocity of 0.1 m/s.

Figure 10:
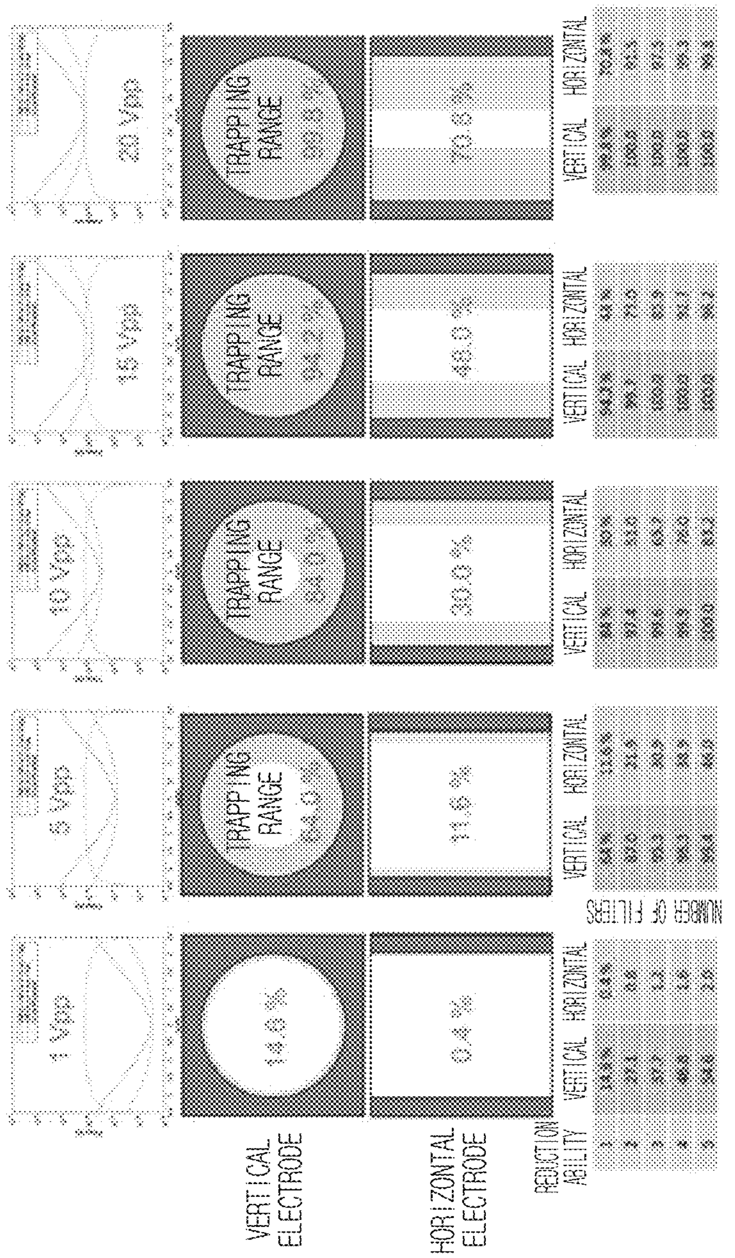
FIG. 10 is a view illustrating a vertical nano-gap electrode including a hole of a diameter of 5 μm and having a pair of electrodes spaced apart by an insulating layer having a thickness of 100 nm, and particulate matter trapping efficiency according the number of filters and applied voltage according to an embodiment of the disclosure.

Furthermore, to confirm the efficiency of trapping particulate matter according to the number of filters arranged in parallel and/or the voltage applied to the vertical nano-gap electrode, the number of filters was changed from 1 to 5, and the efficiencies of removing particulate matter when voltages of 1 Vpp, 5 Vpp, 10 Vpp, 15 Vpp and 20 Vpp were applied to each of the filters were simulated, and the results are illustrated in FIG. 10.

At this time, as the filter, the vertical nano-gap electrodes spaced apart by an insulating layer having a thickness of 100 nm having a hole of a diameter of 5 μm was used, and it was assumed that particles having a size of 2.5 μm flow at the face velocity of 0.1 m/s.

For example, as illustrated in FIG. 10, in the case of applying 10 Vpp at the face velocity of 0.1 m/s, for two types of electrodes (vertical nano-gap vs. horizontal nano-gap) with the same gap of 100 nm, the vertical nano-gap electrode may reduce 84% of fine particles in the air transmitted through a single filter, while in the case of the horizontal nano-gap electrode, a reduction rate was only 30%.

This is more pronounced when expanded to a stacked structure. In the case of the vertical nano-gap, when three filters are stacked and used, the fine particle reduction effect of 99% may be achieved, but in the case of the horizontal nano-gap, even if 5 filters were stacked, the reduction rate was not reached. Even at a low voltage of 1 Vpp, it started to show particle trapping ability, as the voltage increased, the trapping rate remarkably increased, and when a voltage of 20 Vpp was applied, the trapping rate was 70% or more with only a single filter, and when a plurality of filters are arranged in parallel and used, the trapping rate of 75% or more was achieved at 10 Vpp and the trapping rate of 90% or more was achieved at 15 Vpp.

EXAMPLE 5

Figure 11:
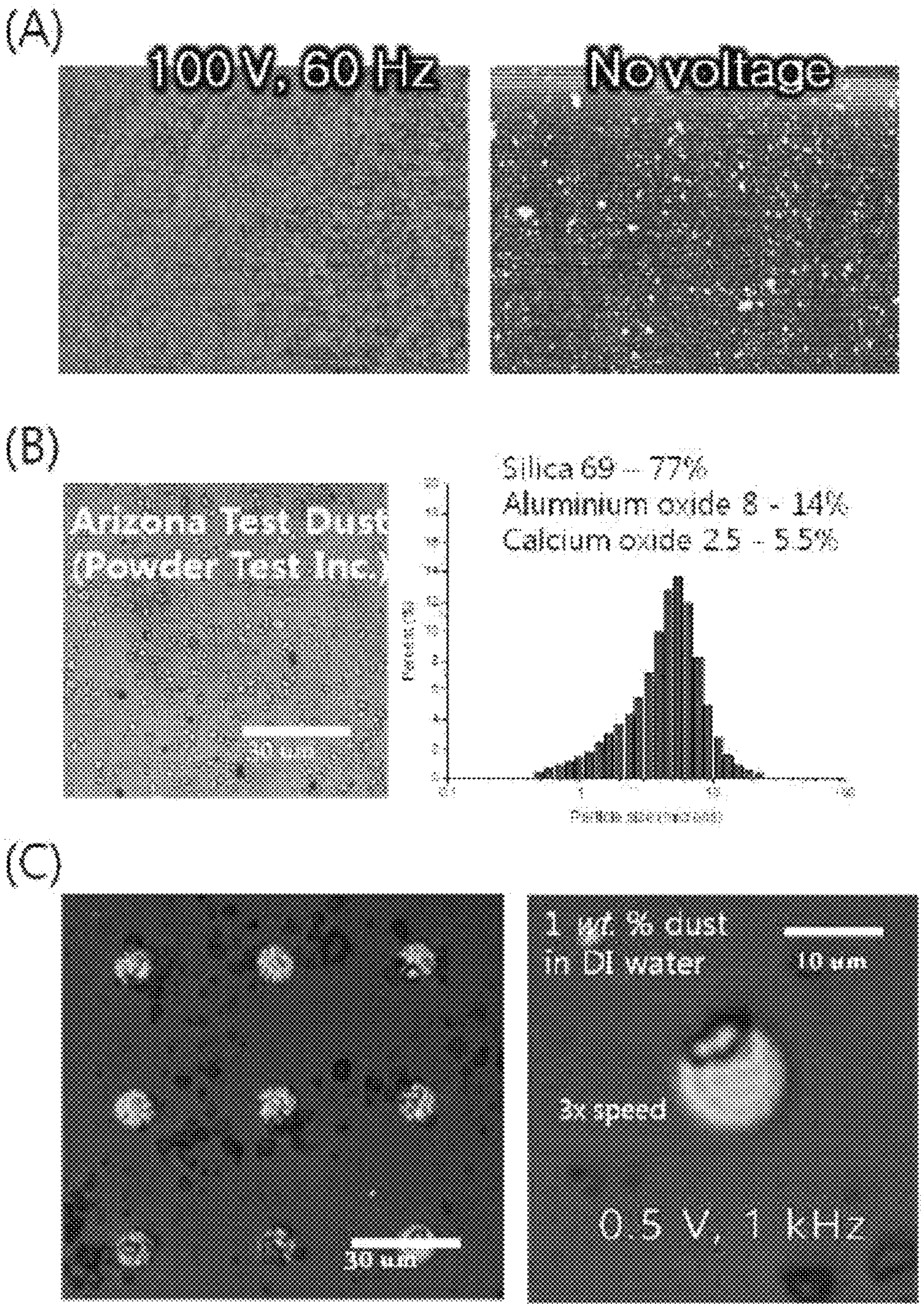
FIG. 11 is a view illustrating (B) the shape and particle distribution of Arizona Dust used as a particulate matter mimic, and a result obtained by observing the particle trapping ability of (A) the horizontal electrode as a comparative example or (C) the vertical nano-gap electrode according to an embodiment of the disclosure in an aqueous solution containing Arizona Dust.

Trapping of Particulate Matter in Aqueous Solution and Atmospheric Environment The trapping of particles in an aqueous solution was confirmed by using Arizona dust containing particles having a size of several tens of nm to several tens of μm as a mimic of particulate matter, and the results are illustrated in FIG. 11. At this time, as an electrode, a horizontal electrode spaced apart at intervals of 10 μm and a vertical nano-gap electrode including a hole having a size of 10 μm and spaced apart by an insulator layer having a thickness of 500 nm were used.

As illustrated in FIG. 11, according to a study by Duff at the University of Louisville, it was confirmed that in the case of using the horizontal electrode, when an alternating current voltage of 100 V is applied in the air at a frequency of 60 Hz, it exhibits particle trapping ability, while the vertical nano-gap electrode traps particles even when a low voltage of 0.5 V is applied (J. D. Duff, Master's thesis, 2013).

Furthermore, to confirm the applicability to the removal of particulate matter in the air, the particle trapping ability in the air, not in an aqueous solution, was confirmed. The conditions used to trap the particles in air together with the existing results measured in the air or the aqueous solution were simulated based on theoretical values, and are illustrated in Table 1 below.

TABLE 1

| | Horizontal Electrode | Vertical Electrode 1 | Vertical Electrode 2 | Vertical Electrode 3 |
|---|---|---|---|---|
| Electrode Gap | 10 μm | 500 nm | 100 nm | 100 nm |
| Environment | In Air (εm = ε0) | In Aqueous Solution (εm = 80ε0) | In Aqueous Solution (εm = 80ε0) | In Air (εm = ε0) |
| Voltage Required to Generate Same $F_{DEP}$ | 42.6 V | 0.50 V | 0.26 V | 8.00 V |

EXAMPLE 6

Fine Particulate Matter Trapping Through Particulate Matter Model Testing

Figure 12:
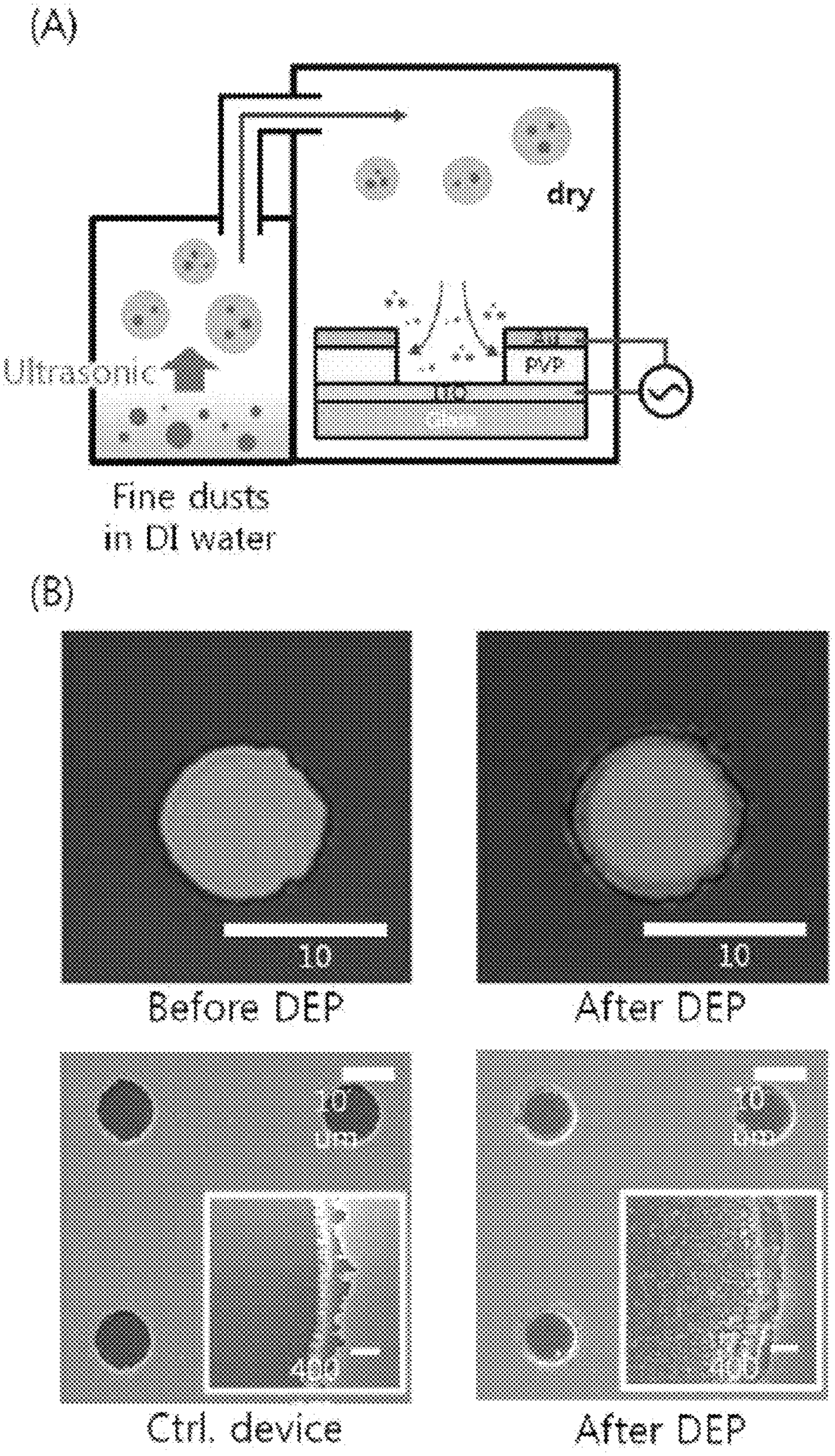
FIG. 12 is a view illustrating (A) an apparatus for measuring fine dust reduction efficiency including the vertical nano-gap electrode according to an embodiment of the disclosure as a filter, and (B) a patterned electrode before/after applying a voltage to the electrode and/or an SEM result obtained by observing the shape of particles trapped in the electrode.

The trapping and/or removal efficiency was confirmed by applying fine particles that simulated actual particulate matter to the filter including the vertical nano-gap electrode in which the effect of reducing particulate matter was confirmed through the simulation in Example 4. As the particulate matter mimic, Arizona dust containing particles having a size of several tens of nm to several tens of μm was used. Arizona dust was sprayed through an ultrasonic humidifier so that it could pass through the filter at a constant flow rate, which was then loaded onto water vapor particles. At this time, the apparatus used for the measurement is schematically illustrated in FIG. 12A, and FIG. 12B illustrates the results obtained by applying a voltage of 10 V at a frequency of 15 kHz to induce dielectrophoresis, and measuring the shape of the electrode before and after voltage application by SEM along with the particles trapped therein. To experimentally implement the above, Arizona dust is injected into an ultrasonic-based humidifier and sprayed to uniformly disperse the fine particles in the air, and the fine particles that are sprayed by being contained in water droplets having a diameter of 1 μm to 2 μm formed therefrom were trapped at the time point when the humidified water droplets are dried.

Figure 13:
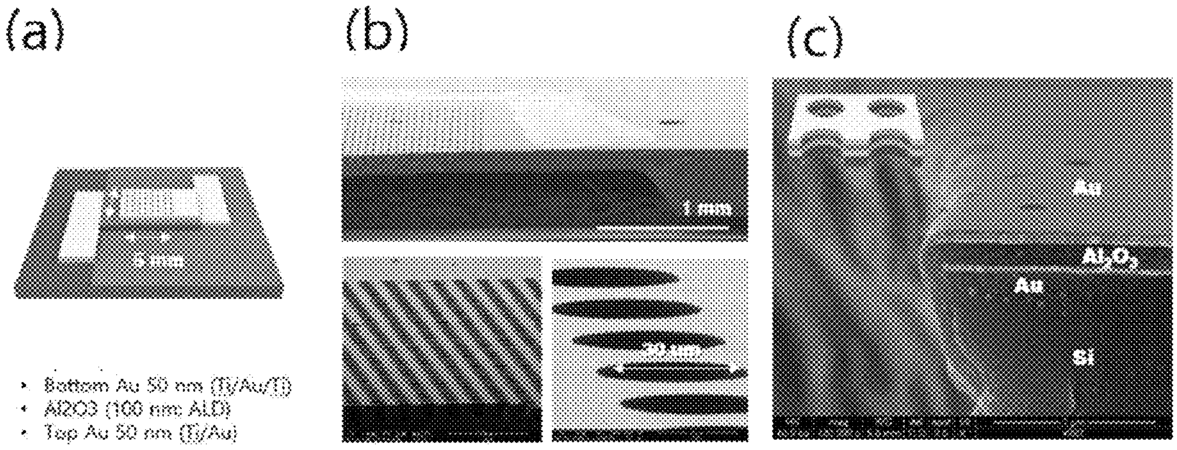
FIG. 13 is a view illustrating (a) a vertical alignment nano-gap electrode structure on a silicon substrate having the top and bottom opened by an opening, SEM results for (b) a structure of the entire filter and (c) a single unit vertical alignment nano-gap electrode structure.

FIG. 13 is a view illustrating (a) a vertical alignment nano-gap electrode structure on a silicon substrate having the top and bottom opened by an opening, SEM results (b) a structure of the entire filter, and (c) a single unit vertical alignment nano-gap electrode structure.

Referring to FIG. 13, in the filter, a first conductor layer, an insulating layer, and a second conductive layer are sequentially stacked on a silicon substrate. Here, the first conductor layer may have a thickness of 50 nm and may be made of gold (Au). In addition, the insulating layer may be positioned on the first conductor layer, have a thickness of 100 nm, and be made of an $Al_2O_3$ material. In addition, the second conductor layer may be positioned on the insulating layer, have a thickness of 50 nm, and be made of gold (Au).

In addition, the filter may have a plurality of holes penetrating through the silicon substrate, the first conductor layer, the insulating layer, and the second conductor layer, and each of the plurality of holes may have a diameter of 30 μm. Referring to FIGS. 13B and 13C, it may be seen that fine holes are formed in a silicon-based support.

Figure 14:
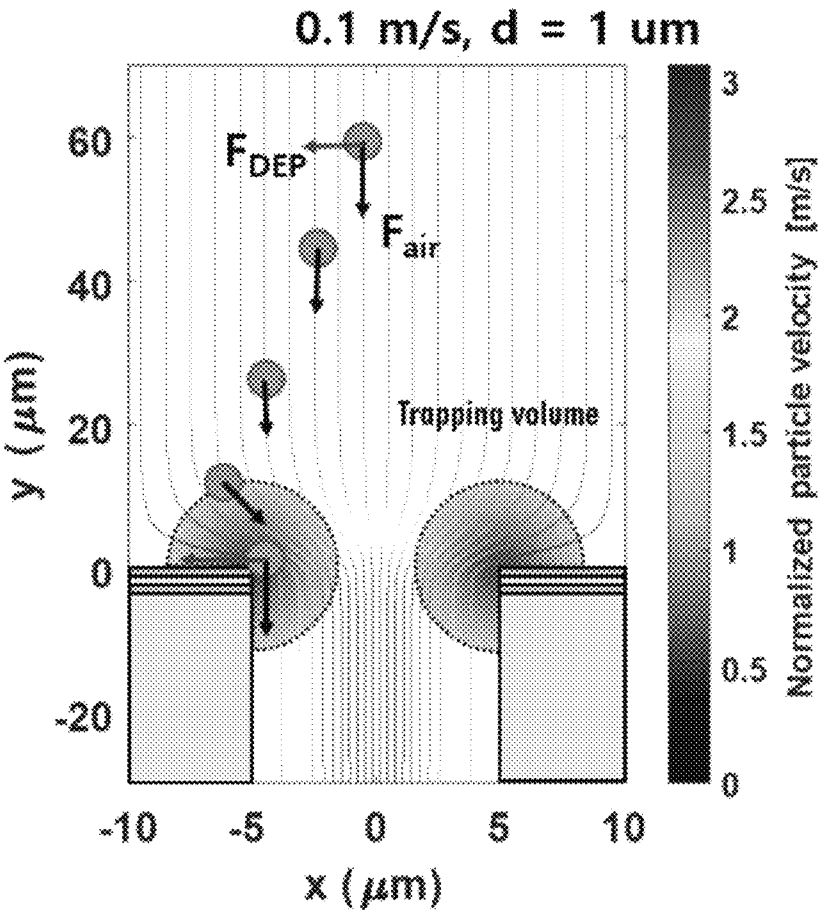
FIG. 14 is a view for describing a principle of trapping particles passing through a vertical alignment nano-gap electrode by a dielectrophoresis method in a flow in air using a nano-gap.

FIG. 14 is a view for describing a principle of trapping particles in air using a nano-gap.

Referring to FIG. 14, when alternating current power is applied to the nano-gap, an electric field is generated in a nano-gap region. When the particles pass through the hole at the generated flow rate (e.g., 0.1 m/s velocity), particles of a specific size may be trapped by the force of dielectrophoresis of the nano-gap on the side surface of the hole. Hereinafter, a selective trapping operation for each particle size will be described with reference to FIG. 15.

Figure 15:
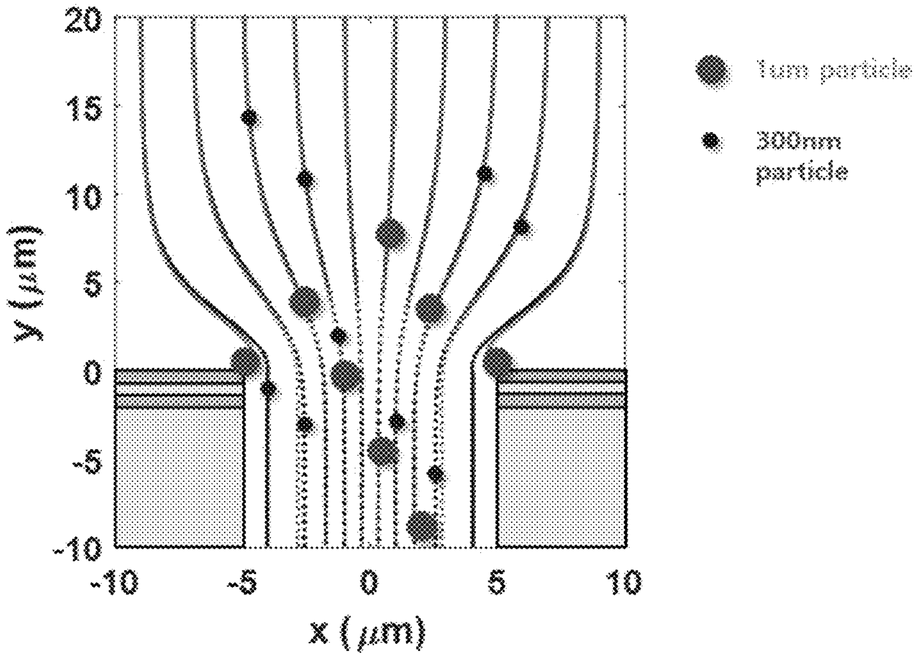
FIG. 15 is a view for describing a selective trapping operation according to a size of particles.

FIG. 15 is a view for describing a selective trapping operation according to a size of particles.

Referring to FIG. 15, a nano-gap is 100 nm and alternating current power of 20 V is applied to a hole of 10 μm. Under the above-described conditions, the alternating current power of 20 V is for trapping particles having a size of 1 μm, and as illustrated, particles of 300 nm may pass through the corresponding hole, and particles of 1 μm may be trapped by the force of dielectrophoresis of the nano-gap on the side surface of the hole. At this time, due to a large volume of particles of 1 μm, the particles may be trapped at the periphery of the electrode through the force of dielectrophoresis of a critical value or more.

Figure 16:
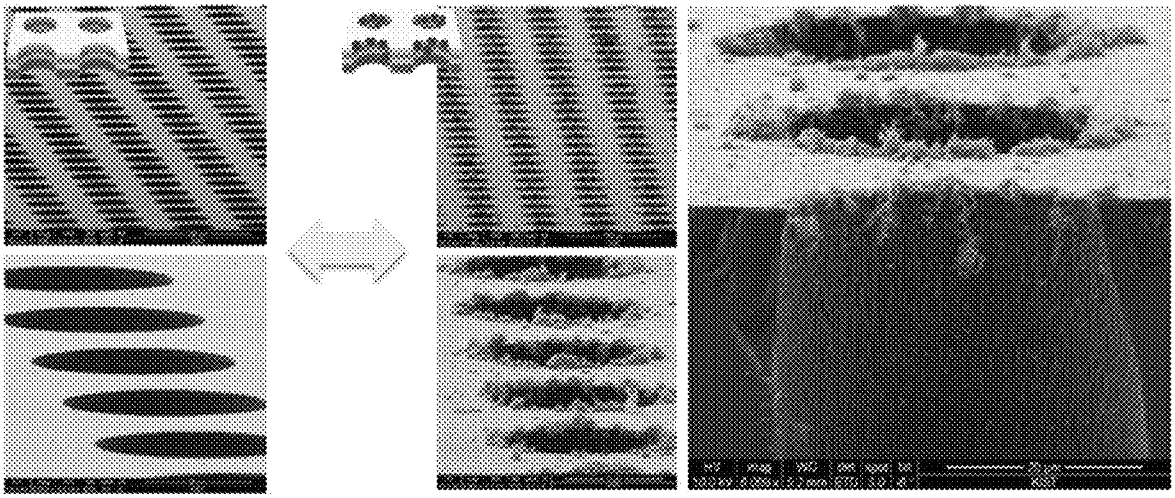
FIG. 16 is SEM images before/after trapping Arizona dust on the filter formed as in FIG. 13.

FIG. 16 is SEM images of the filter formed as illustrated in FIG. 13 before and after the trapping operation.

Referring to FIG. 16, the trapping operation used alternating current power of 20 V, and it may be seen that even with a relatively low voltage of 20V, nano-particles of 300 nm or less are trapped. When comparing the fact that an alternating current voltage of approximately 200 V to 250 V is required to trap nano-particles of 300 nm or less using the existing technology, the filter using the disclosure may reduce power consumption during filter operation.

Figure 17:
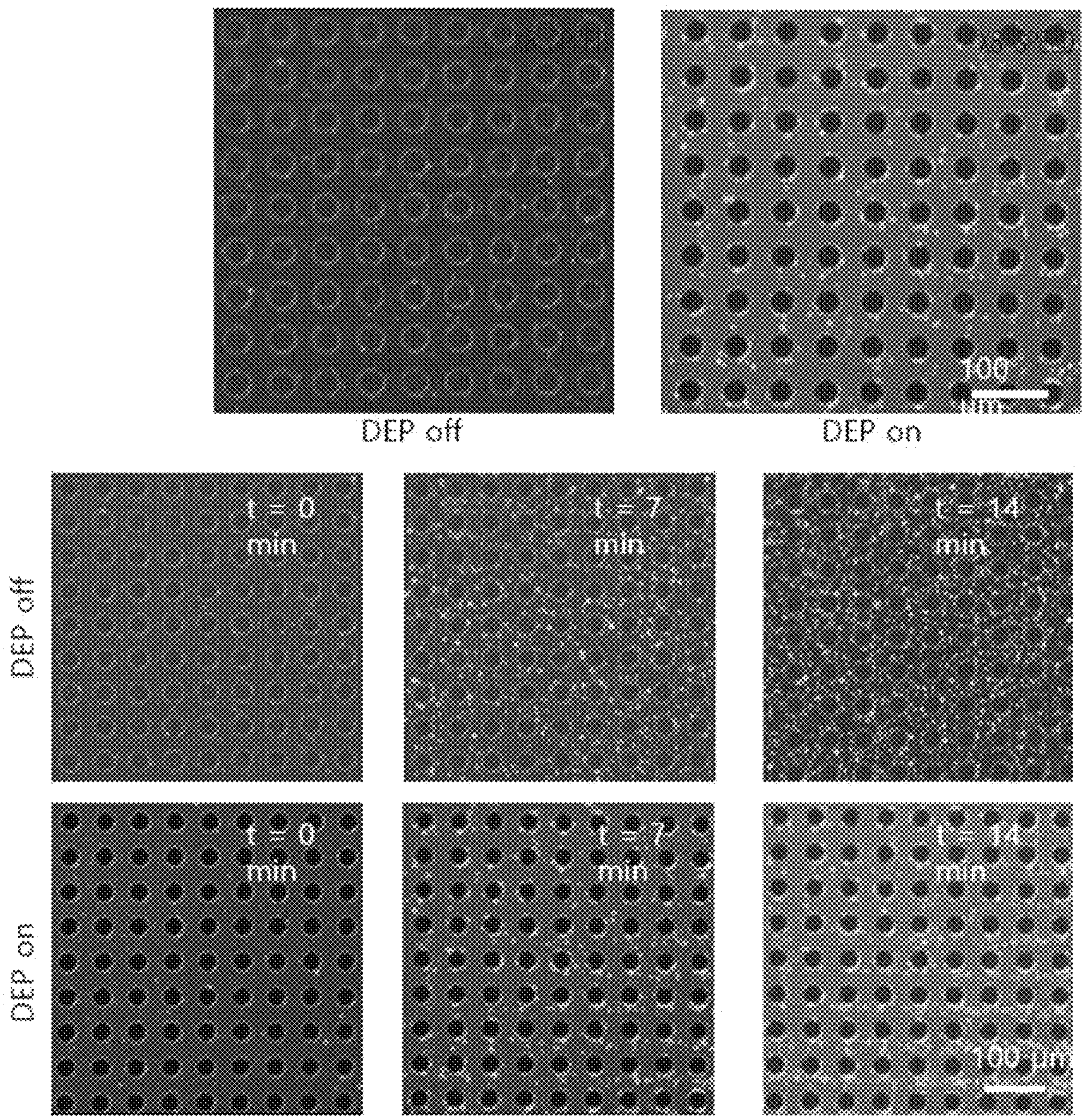
FIG. 17 is a view illustrating the result obtained by observing the particle trapping ability of the vertical nano-gap electrode in a humidified environment.

FIG. 17 is a view illustrating the result obtained by observing the particle trapping ability of the vertical nano-gap electrode in a humidified environment. Specifically, such a result is an SEM image to confirm the trapping operation in the humidified environment, and the alternating current power having a voltage magnitude of 20 V and a frequency of 100 Hz was used.

Referring to FIG. 17, when the alternating current power is not applied, that is, when the trapping using the dielectrophoresis method is not performed using the nano-gap, it may be seen that the particles accumulate over time in areas where holes are not arranged, regardless of the size of the particles.

On the other hand, when the alternating current power is applied, that is, the trapping using the dielectrophoresis method is performed, it may be seen that only particles of relatively constant size are gradually trapped around the hole over time.

Figure 18:
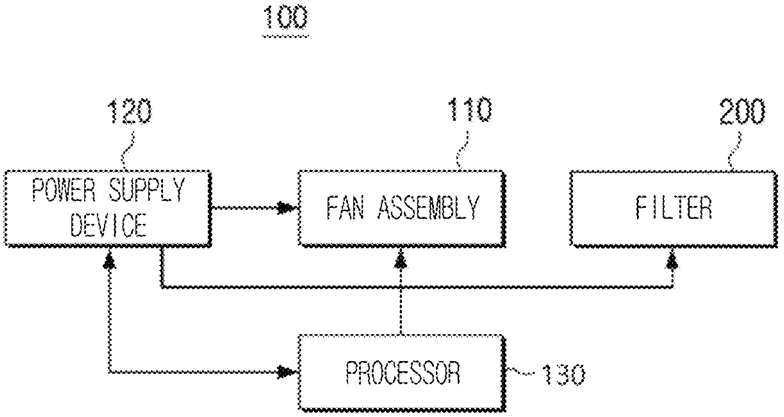
FIG. 18 is a block diagram illustrating a configuration of an air conditioning apparatus according to an embodiment of the disclosure.

FIG. 18 is a block diagram illustrating a configuration of an air conditioning apparatus according to an embodiment of the disclosure.

Referring to FIG. 18, an air conditioning apparatus 100 may include a filter 200, a fan assembly 110, a power supply device 120, and a processor 130. Here, the air conditioning apparatus 100 is an apparatus necessary to achieve the purpose of air conditioning, and performs at least one of functions of cooling, heating, humidifying, reducing humidity, and purifying air, and types thereof may include an air cleaner, an air conditioner, a humidifier, and a vacuum cleaner. In addition, the above-described air conditioning apparatus may be not only for home use, but also an air purification facility for trapping particulate matter of a factory.

The filter 200 may include a plurality of holes constituting the nano-gap. For example, the filter 200 may include a first conductor layer, an insulating layer having a thickness in the range of 5 nm to 1000 nm, and a second conductor layer which are sequentially staked, and include a plurality of holes penetrating through the first conductor layer, the insulating layer, and the second conductor layer. The filter 200 has been previously described as the filter for removing particulate matter, and thus a redundant description will be omitted.

The fan assembly 110 may generate air flow in the air conditioning apparatus. Specifically, the fan assembly 110 may include a fan to receive air from the outside, provide the introduced air to the filter 200, and allow the air that has passed through the filter 200 to flow out. Such a fan assembly 110 may be disposed on an upstream side of the air flow or may also be disposed on a downstream side thereof.

The power supply device 120 may supply power to the air conditioning apparatus 100. In addition, the power supply device 120 may supply alternating current power to the filter 200. For example, the power supply device 120 may receive commercial alternating current power from the outside and generate a preset DC power to supply the DC power to a component such as the processor 130, and may generate alternating current power having a preset frequency and a preset voltage and provide the alternating current power to the filter 200.

In addition, the power supply device 120 may generate a high voltage capable of eradicating bacteria and the like.

Here, the generated alternating current power may have at least one of a frequency or a voltage magnitude variable according to the control of the processor 130 to be described later.

The processor 130 controls each component of the air conditioning apparatus 100. For example, the processor 130 may control the fan assembly 110 so that external air is supplied to the filter 200 when an air conditioning operation is required, and may control the power supply device 120 so that alternating current power having a preset frequency and power is provided to the filter 200.

In addition, when a size of a trapping material is selected, the processor 130 may control the power supply device so that alternating current power having a frequency and a voltage magnitude corresponding to the selected size of the trapping material is provided to the filter. Here, the frequency and the voltage magnitude may be determined by Mathematical expressions 1 and 2 described above, and a pre-stored lookup table (e.g., a table in which frequency and voltage magnitude information corresponding to a trapping target is stored) may be used.

In addition, the processor 130 may adjust the magnitude of the alternating current power supplied to the filter 200 based on the amount of detected particulate matter. For example, when a small amount of particulate matter is detected, the processor 130 may reduce power consumption by controlling the power supply device 120 so that a relatively low voltage (e.g., 1 V to 5 V) is applied, and when a large amount of particulate matter is detected, the processor 130 may control the power supply device 120 to apply a relatively high voltage (10 V to 20 V) so that a trapping range of the nano-gap is wide.

In addition, the processor 130 may control the trapping operation of the filter 200 according to an operation mode of the air conditioning apparatus. For example, the air conditioning apparatus may include a trapping mode for trapping a specific object and a discharge mode for discharging the trapped object. In the trapping mode, the processor 130 may control the power supply device 120 so that the plurality of holes of the filter 200 supply first alternating current power having an attractive force for the target object, and in the discharge mode, the processor 130 may control the power supply device 120 so that the plurality of holes of the filter 200 supply second alternating current power having a repulsive force for the target object.

In addition, when the air conditioning apparatus operates in a mode that traps microorganisms such as viruses and bacteria, the processor 130 may control the power supply device 120 so that a high voltage capable of eradicating viruses and bacteria is supplied to the filter 200 at a predetermined periodic unit.

Meanwhile, the air conditioning apparatus 100 may further include a user interface device (not illustrated), receive a selection of the operation mode (or trapping target) described by the user through the user interface, and control the power supply device 120 to provide a frequency and power for trapping the selected operation mode (or trapping target) to the filter 200.

In addition, the air conditioning apparatus 100 may control the power supply device 120 so that alternating current power having a frequency and power corresponding to the detected particle size is provided to the filter 200 by using a sensor (not illustrated) that detects the particle size in the air.

As described above, the air conditioning apparatus according to the embodiment is capable of trapping not only particulate matter, but also viruses, bacteria, and fungi, and may perform the trapping operation by adaptively changing the trapping target by varying the alternating current power supplied to the filter. In addition, the above-described air conditioning apparatus may trap particulate matter, viruses, and the like at the lower voltage (e.g., 1 V to 50 V) by using the filter having the nano-gap.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An air conditioning apparatus comprising:

a filter;

a fan assembly configured to suck air from the outside and provide the sucked air to the filter;

a power supply device configured to provide alternating current power to the filter; and a processor configured to control the power supply device to selectively vary a frequency, or a voltage magnitude of the alternating current power provided to the filter, wherein the filter has a first conductor electrode, an insulator layer having a constant thickness in the range of 5 nm to 1000 nm, and a second conductor electrode. wherein the first conduc ectrode, the insulator layer and the second conductor electrode sequentially stacked;

wherein the filter includes a plurality of holes penetrating through the first conductor electrode, the insulator layer, and the second conductor electrode;

wherein the first conductor electrode is disposed in a direction perpendicular to an air flow;

wherein the insulator layer is exposed to the air flow through the plurality of holes; and wherein the filter has a dielectrophoresis force formed between the first conductor electrode exposed to the air flow in the plurality of holes and the second conductor electrode exposed to the air flow in the plurality of holes.

2. The air conditioning apparatus as claimed in claim 1, wherein the processor is configured to control the power supply device so that alternating current power having a frequency and a voltage magnitude corresponding to a selected size of a trapping material, based on the selected size of the trapping material.

3. The air conditioning apparatus as claimed in claim 1, wherein the processor is configured to:

control the power supply device supply first alternating current power so that the plurality of holes having an attractive force for a target object in a trapping mode of the air conditioning apparatus, and control the power supply device so that the plurality of holes supplies second alternating current power having a repulsive force for the target object in a discharge mode of the air conditioning mode.

4. The air conditioning apparatus as claimed in claim 1, further comprising a sensor configured to detect a size of particles in air, wherein the processor is configured to control the power supply device so that alternating current power corresponding to the size of the particles detected by the sensor is provided to the filter.

5. The air conditioning apparatus as claimed in claim 1, further comprising a user interface device configured to receive a selection for a trapping material, wherein the processor is configured to control the power supply device so that alternating current power corresponding to the trapping material selected through the user interface device is provided to the filter.

6. The air conditioning apparatus as claimed in claim 1, wherein the plurality of holes is arranged in a matrix form and have the same area.

7. The air conditioning apparatus as claimed in claim 1, wherein each of the plurality of holes has an area of 50 $nm^2$ to 10,000 $\mu m^2$.

8. The air conditioning apparatus as claimed in claim 1, wherein the power supply device provides alternating current power having a voltage magnitude within the range of 1 V to 50 V to the filter according to a thickness of a nano-gap or the size and type of target particles.

9. The air conditioning apparatus as claimed in claim 1, wherein the filter is mounted interchangeably in the air conditioning apparatus.

10. The air conditioning apparatus as claimed in claim 1, wherein a plurality of the filters is provided in a moving direction of air.

11. The air conditioning apparatus as claimed in claim 10, wherein the plurality of filters include:

a first filter including a plurality of holes; and a second filter including a plurality of holes disposed to coincide with or alternate with the plurality of holes of the first filter.

12. The air conditioning apparatus as claimed in claim 10, wherein the plurality of filters includes:

a first filter including a plurality of holes of a first size; and a second filter including a plurality of holes smaller than the first size and secondary filtering air filtered through the first filter.

13. The air conditioning apparatus as claimed in claim 1, wherein the filter further includes an additional insulating layer and an additional conductor layer having a thickness in the range of 5 nm to 1000 nm that are sequentially stacked on the second conductor layer.

* * * * *